(12) United States Patent
Münks et al.

(10) Patent No.: US 12,538,926 B2
(45) Date of Patent: Feb. 3, 2026

(54) COMBINATION OF BACTERIAL BIOLOGICAL CONTROL AGENT AND FATTY ACIDS

(71) Applicant: Bayer Aktiengesellschaft, Leverkusen (DE)

(72) Inventors: Karl-Wilhelm Münks, Neuss (DE); Jolanda Maud Wijsmuller, VD Houten (NL); Gilbert Labourdette, Paray le Monial (FR)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 993 days.

(21) Appl. No.: 17/280,101

(22) PCT Filed: Sep. 27, 2019

(86) PCT No.: PCT/EP2019/076216
§ 371 (c)(1),
(2) Date: Mar. 25, 2021

(87) PCT Pub. No.: WO2020/065025
PCT Pub. Date: Apr. 2, 2020

(65) Prior Publication Data
US 2022/0022463 A1    Jan. 27, 2022

(30) Foreign Application Priority Data
Sep. 28, 2018 (EP) ................. 18197495

(51) Int. Cl.
*A01N 63/25* (2020.01)
*A01N 37/02* (2006.01)
*A01N 63/22* (2020.01)

(52) U.S. Cl.
CPC ............ *A01N 63/25* (2020.01); *A01N 37/02* (2013.01); *A01N 63/22* (2020.01)

(58) Field of Classification Search
CPC ......... A01N 63/25; A01N 63/22; A01N 37/02
See application file for complete search history.

(56) References Cited

U.S. PATENT DOCUMENTS

| | | | |
|---|---|---|---|
| 4,826,678 A | 5/1989 | Gaudet et al. | |
| 9,078,447 B2 | 7/2015 | Schoefl et al. | |
| 9,364,006 B2 | 6/2016 | Wachendorff-Neumann et al. | |
| 9,370,188 B2 | 6/2016 | Hellwege et al. | |
| 9,380,787 B2 | 7/2016 | Wachendorff-Neumann et al. | |
| 9,386,773 B2 | 7/2016 | Wachendorff-Neumann et al. | |
| 9,392,797 B2 | 7/2016 | Schoefl et al. | |
| 9,398,770 B2 | 7/2016 | Hellwege et al. | |
| 9,439,426 B2 | 9/2016 | Cristau et al. | |
| 9,497,972 B2 | 11/2016 | Hellwege et al. | |
| 9,585,399 B2 | 3/2017 | Hellwege et al. | |
| 9,596,860 B2 | 3/2017 | Wachendorff-Neumann et al. | |
| 9,700,056 B2 | 7/2017 | Wachendorff-Neumann et al. | |
| 9,706,777 B2 | 7/2017 | Wachendorff-Neumann et al. | |
| 9,737,078 B2 | 8/2017 | Hellwege et al. | |
| 9,743,674 B2 | 8/2017 | Schoefl et al. | |
| 9,756,864 B2 | 9/2017 | Wachendorff-Neumann et al. | |
| 9,770,034 B2 | 9/2017 | Hellwege et al. | |
| 9,795,138 B2 | 10/2017 | Frank et al. | |
| 9,801,387 B2 | 10/2017 | Hellwege et al. | |
| 9,814,241 B2 | 11/2017 | Wachendorff-Neumann et al. | |
| 9,907,312 B2 | 3/2018 | Hellwege et al. | |
| 9,968,097 B2 | 5/2018 | Wachendorff-Neumann et al. | |
| 9,993,004 B2 | 6/2018 | Frank et al. | |
| 10,028,509 B2 | 7/2018 | Wachendorff-Neumann et al. | |
| 10,064,412 B2 | 9/2018 | Hellwege et al. | |
| 10,092,008 B2 | 10/2018 | Frank et al. | |
| 10,212,942 B2 | 2/2019 | Schoefl et al. | |
| 10,258,040 B2 | 4/2019 | Muenks et al. | |
| 10,306,889 B2 | 6/2019 | Hellwege et al. | |
| 10,542,757 B2 | 1/2020 | Hellwege et al. | |
| 2013/0079224 A1* | 3/2013 | Smith ................ | A01N 43/16 504/242 |
| 2016/0183536 A1* | 6/2016 | Martin ................ | A01N 53/00 424/93.46 |
| 2016/0227788 A1 | 8/2016 | Frank et al. | |
| 2018/0235234 A1 | 8/2018 | Hellwege et al. | |

(Continued)

FOREIGN PATENT DOCUMENTS

| | | |
|---|---|---|
| EP | 3148337 B1 | 5/2019 |
| JP | 2012521390 A | 9/2012 |
| JP | 2016153381 A | 8/2015 |

(Continued)

OTHER PUBLICATIONS

Oleic acid, 2016, screenshot from Wayback machine; from https://web.archive.org/web/20160412121802/https://www.ch.ic.ac.uk/vchemlib/mim/bristol/oleic_acid/oleic_text.htm (Year: 2016).*

Choi, G.J., et al., "Antifungal Activities of Bacillus thuringiensis Isolates on Barley and Cucumber Powdery Mildews," J. Microbiol. Biotechnol., Jan. 1, 2007, vol. 17, No. 12, pp. 2071-2075.

Diomande, S.E., et al., "Role of Fatty Acids in Bacillus Environmental Adaptation," Frontiers in Microbiology, Aug. 5, 2015, vol. 6, article 813, 20 pages.

Highland, H.B., "The Use of Serenade Max® to Control Summer Diseases of Apples in the Eastern U.S.," Fifth National IPM Symposium, "Delivering on a Promise," St. Louis, MO, U.S.A., Apr. 4, 2006, 1 page, retrieved from the Internet: URL:http://www.ipmcenters.org/IPMSymposiumV/posters/068.pdf [retrieved on Aug. 11, 2015].

(Continued)

*Primary Examiner* — Bethany P Barham
*Assistant Examiner* — Ayaan A Alam
(74) *Attorney, Agent, or Firm* — Michael VanEngelen

(57) ABSTRACT

The present invention relates to a composition comprising a) at least one biological control agent which is a fungicidally active bacterium and/or a fungicidally active metabolite produced by the respective bacterium and b) one or more fatty acids or derivatives thereof selected from unsaturated and saturated $C_{12-24}$ fatty acids, salts thereof, esters thereof or mixtures of any of the foregoing as well as methods of using this composition and related uses.

13 Claims, No Drawings

(56) References Cited

U.S. PATENT DOCUMENTS

2021/0127684 A1* 5/2021 Singh .................. A01N 63/23

FOREIGN PATENT DOCUMENTS

| RU | 2636167 C2 | 11/2021 |
| WO | 96/28022 A2 | 9/1996 |
| WO | 2010033714 A1 | 3/2010 |
| WO | 2010108973 A2 | 9/2010 |
| WO | 2013110591 A1 | 8/2013 |
| WO | 2015156274 A1 | 10/2015 |
| WO | 2016189329 A2 | 12/2016 |
| WO | 2017092978 A1 | 6/2017 |
| WO | 2021064075 A1 | 4/2021 |
| WO | 2021099271 A1 | 5/2021 |

OTHER PUBLICATIONS

International Search Report and Written Opinion of the International Searching Authority for PCT International Patent Application No. PCT/EP2019/076216, dated Nov. 15, 2019, 15 pages.

Dorighello, D. V. et al., "Controlling Asian soybean rust (*Phakopsora pachyrhizi*) with *Bacillus* spp. and coffee oil" Crop Protection, vol. 67, pp. 59

COMBINATION OF BACTERIAL BIOLOGICAL CONTROL AGENT AND FATTY ACIDS

CROSS-REFERENCE TO RELATED APPLICATIONS

The present application is a 35 U.S.C. § 371 national phase entry of PCT/EP2019/076216, filed on Sep. 27, 2019, which claims priority to European Patent Application No. 18197495.7, filed Sep. 28, 2018, all of which are hereby incorporated by reference in their entirety.

The use of plant protection products comprising biological control agents (BCAs) has become a valuable alternative in the field of plant protection. Biological control agents directed against fungi or insects as well as those promoting plant health have been put on the market in different formulations.

Several plant protection agents based on bacteria such as those of the genus *Bacillus* and *Paenibacillus* are known. Furthermore, plant protection agents based on plant extracts are known, such as a composition comprising fatty acids or derivatives thereof known as FLIPPER™.

WO2016/189329 discloses the use of a combination of certain fatty acids and a *Trichoderma* strain to increase plant health or to combat nematodes or certain fungal diseases. WO2017/092978 discloses compositions of a metal compound and certain fatty acids for crop defense and against fungi, oomycetes and bacteria.

In most cases, the effectiveness of BCAs is not at the same level as for conventional insecticides and fungicides, especially in case of severe infection pressure. Consequently, in some circumstances, biological control agents, their mutants and metabolites produced by them are, in particular in low application rates, not entirely satisfactory. Thus, there is a constant need for developing new plant health-enhancing and/or plant protection compositions, including biological control agents used in conjunction with other agents, to strive to fulfill the above-mentioned requirements.

In view of this, it was in particular an object of the present invention to provide compositions which have an enhanced ability to improve plant growth and/or to enhance plant health or which exhibit enhanced activity against insects, mites, nematodes and/or phytopathogens.

Accordingly, in a first aspect, the present invention relates to a composition comprising (a) at least one biological control agent which is a bacterium active against at least one plant pathogen, in particular a fungicidally and/or bactericidally active bacterium and/or a metabolite produced by the respective bacterium which is active against at least one plant pathogen and (b) one or more fatty acids or derivatives thereof selected from unsaturated and saturated $C_{12-24}$ fatty acids, salts thereof, esters thereof or mixtures of any of the foregoing.

The term "at least one" in connection with the present invention relates to one or more of a kind, such as (at least) two, (at least) three or even (at least) four.

Bacteria active against plant pathogens may comprise fungicidally and bactericidally active bacteria or those active against oomycetes. In a preferred embodiment, the bacteria are thus fungicidally and/or bactericidally active and/or active against oomycetes, more preferably at least fungicidally active and most preferably at least fungicidally active and active against oomycetes.

Fatty acids are compounds of formula $RCO_2H$ where R is an aliphatic hydrocarbon group. Typically, R is a long chain aliphatic hydrocarbon group. For the purpose of the present invention. R may be a saturated or unsaturated aliphatic hydrocarbon group having from 11 to 23 carbons (i.e. a C12-24 fatty acid). Typically, R is a linear, saturated or unsaturated aliphatic hydrocarbon group having from 11 to 23 carbon atoms, e.g. a linear C11-23 alkane group or a linear C11-23 alkene group. R is often a linear, saturated or unsaturated, aliphatic hydrocarbon group having from 11 to 21 carbon atoms, e.g. a linear C11-21 alkane group or a linear C11-21 alkene group. Unsaturated aliphatic hydrocarbon groups typically contain from 1 to 4 double bonds, for instance 1 or 2 double bonds. Products based on fatty acids and/or salts and/or derivatives thereof are marketed as biological control agents as well, e.g. the product FLIPPER® available from AlphaBioControl.

Derivatives of fatty acids include salts, esters and amides of the fatty acid. Typically, a derivative of the fatty acid, as used herein is a salt or an ester of the fatty acid.

An ester of a fatty acid is typically an ester of the fatty acid with an alcohol such as methanol, ethanol, propanol, butanol, ethane-1,2-diol, propane-1,3-diol and propane-1,2,3-triol (glycerol). The derivative of the fatty acid may be a salt of the fatty acid or a methyl ester of the fatty acid (i.e. $RCO_2Me$). Alternatively, the derivative of the C12-C24 fatty acid may be an ester of methanol, ethanol, 1-propanol, 2-propanol, butanol or a mixture thereof.

A salt of a fatty acid is typically a metal salt of the fatty acid. Often, the one or more fatty acids or derivatives thereof are one or more metal salts of fatty acids. The metal salts are typically alkali metal salts or earth alkali metal salts, but also comprise aluminum, copper, iron and zinc salts. Alkali metal salts of fatty acids include lithium, sodium, potassium and rubidium salts of fatty acids. The composition may therefore comprise one or more fatty acids or sodium or potassium salts thereof. For instance, component (b) may be one or more sodium or potassium salt of fatty acids. Earth alkali metal salts of fatty acids include magnesium and calcium salts. The composition may therefore comprise one or more fatty acids or magnesium or calcium salts thereof. For instance, component (b) may be one or more magnesium or calcium salt of fatty acids. Alternatively, or in addition, component (b) may be one or more aluminum, copper, iron or zinc salt of fatty acids. Such salts may be formed by reacting the one or more fatty acids with a base comprising the desired metal cation, for instance by reacting one or more fatty acids with sodium hydroxide or potassium hydroxide in case of alkali metals, magnesium hydroxide or calcium hydroxide for earth alkali metals, or aluminum hydroxide, copper hydroxide, zinc hydroxide or iron hydroxide for other metals.

In a preferred embodiment, component b) is one or more fatty acid. In other words, in this preferred embodiment, the composition according to the invention comprises one or more fatty acids but not salts or derivatives thereof.

The one or more fatty acids or derivatives thereof as described above may be present in a mixture. For example, the part of the composition according to b) may comprise one or more fatty acids and one or more esters of at least one fatty acid and/or one or more salt of a fatty acid. In this respect, the fatty acid forming the basis of the one or more ester and/or the one or more salt of fatty acids may be the same or a different fatty acid than a fatty acid comprised in the part of the composition according to b). For example, if a mixture of fatty acids and salts of fatty acids is present, the ratio of fatty acids:salts of fatty acids may range between 1:10000 and 10000:1, such as between 1:1000 and 1000:1.

The one or more fatty acids or derivatives thereof are typically selected from saturated and unsaturated acids selected from undecylic acid (C11), lauric acid (C12), tridecylic acid (C13), myristic acid (C14), pentadecanoic acid (C15), palmitic acid (C16), margaric acid (C17), stearic acid (C18), nonadecylic acid (C19), arachidic acid (C20), heneicosylic acid (C21), behenic acid (C22), tricosylic acid (C23), lignoceric acid (C24), and derivatives thereof; and unsaturated acids selected from u-linolenic acid (C18:3), stearidonic acid (C18:4), eicosapentaenoic acid (C20:5), docosahexaenoic acid (C22:6), linoleic acid (C18:2), y-linolenic acid (C18:3), dihomo-y-linolenic acid (C20:3), arachidonic acid (C20:4), adrenic acid (C22:4), palmitoleic acid (C16:1), vaccenic acid (C18:1), paullinic acid (C20:1), oleic acid (C18:1), elaidic acid (Ctrans-18:1), gondoic acid (C20:1), erucic acid (C22:1), nervonic acid (C24:1), mead acid (20:3) and derivatives thereof.

The notation CM:N fatty (where M and N are integers), as used herein, means that the fatty acid comprises M carbon atoms and N double bonds. The N double bonds may be at any position (cis or trans configuration), although two double bonds are not usually adjacent (i.e. bonded to the same carbon atom). Thus, C18:0 (or simply C18) covers only octadecanoic acid (stearic acid) and C18:1 includes all fatty acids having 18 carbons and one double bond, such as oleic acid ((Z)-octadec-9-enoic acid) and vaccenic acid ((E)-octadec-11-enoic acid).

The fatty acids or derivatives thereof may originate from any plant producing such fatty acids, preferably from an organ of a plant producing and/or containing high contents of fatty acids such as seeds. Examples of such seeds include apple seed, argan seed, coconut, colza, canola, corn, cottonseed, grape seed, hazelnut, macadamia, mustard, niger seed, olive, palm kernel, peanut, poppyseed, pumpkin seed, ramtil, rice bran, safflower, soybean, sesame, sunflower, tamarind seed, tea seed and walnut. Preferably, the fatty acids or derivatives thereof originate from olive oil, sunflower oil (both regular and high oleic acid sunflower oil), soybean oil and canola oil. More preferably, the fatty acids originate from olive oil obtained from the endocarp and/or olive seed (olive pits). The fatty acids or derivatives thereof may also be Tall Oil Fatty Acids (TOFA). TOFA are based on a by-product of the Kraft process of wood pulp manufacture when pulping mainly coniferous trees called tall oil and are a result of reducing rosin content of tall oil to between 1 and 10 wt. %, e.g. by fractional distillation. TOFA consists mainly of oleic acid.

The fatty acids or derivatives thereof may equally originate from animals (for a review see Food Processing: Principles and Applications, Second Edition. Edited by Stephanie Clark, Stephanie Jung, and Buddhi Lamsal© 2014 John Wiley & Sons, Ltd. Published 2014 by John Wiley & Sons, Ltd; Chapter 21: Fats and Oils—Animal Based).

Fungicidally active bacteria are able to act against e.g. fungal (plant) pathogens through different modes of action. Bactericidally active bacteria are able to act against bacterial (plant) pathogens. Several members of the genus *Bacillus* or *Paenibacillus* are known to exert fungicidal and/or bactericidal effects.

The term "metabolite" refers to any compound, substance or byproduct of a fermentation of a bacterium that has activity against at least one plant pathogen, in particular which has fungicidal and/or bactericidal activity.

According to one embodiment of the present invention the biological control agent comprises not only the isolated, pure cultures of the respective bacterium, in particular the fungicidally and/or bactericidally active bacterium but also suspensions in a whole broth culture or a metabolite-containing supernatant or a purified metabolite obtained from whole broth culture of the bacterial strain. "Whole broth culture" refers to a liquid culture containing both cells and media. "Supernatant" refers to the liquid broth remaining when cells grown in broth are removed by centrifugation, filtration, sedimentation, or other means well known in the art. According to another embodiment, the biological control agent comprises the isolated, pure cultures of the respective bacterium formulated in a suitable formulation apart from its fermentation broth, as described further below.

The above-mentioned metabolites produced by bacteria include antibiotics, enzymes, siderophores and growth promoting agents, for example zwittermicin-A, kanosamine, polyoxine, enzymes such as α-amylase, chitinases, and pektinases, phytohormones and precursors thereof, such as auxines, gibberlin-like substacnes, cytokinin-like compounds, lipopeptides such as iturins, plipastatins or surfactins, e.g. agrastatin A, bacillomycin D, bacilysin, difficidin, macrolactin, fengycin, bacilysin and bacilaene. Preferred metabolites of the above listed are lipopeptides, in particular those produced by *Bacillus pumilus* (NRRL Accession No. B-30087) or *Bacillus subtilis* AQ713 (NRRL Accession No. B-21661). Especially preferred metabolites are Iturin A, Surfactin, Plipstatin and Agrastatin A. An even more preferred metabolite is agrastatin A.

According to the invention, the biological control agent may be employed or used in any physiologic state such as active or dormant.

The genus *Bacillus* as used herein refers to a genus of Gram-positive, rod-shaped bacteria which are members of the division Firmicutes. *Bacillus* bacteria may be characterized and identified based on the nucleotide sequence of their 16S rRNA or a fragment thereof (e.g., approximately a 1000 nt, 1100 nt, 1200 nt, 1300 nt, 1400 nt, or 1500 nt fragment of 16S rRNA or rDNA nucleotide sequence).

In one embodiment, said biological control agent is a strain of a bacterial species selected from the group consisting of *Bacillus subtilis, Bacillus pumilus, Bacillus amyloliquefaciens, Bacillus mycoides, Bacillus licheniformis,* and *Paenibacillus* sp.

If of the genus *Bacillus*, the bacterium active against at least one plant pathogen, in particular the fungicidally and/or bactericidally active bacterium may be of any of the species of *B. acidiceler, B. acidicola, B. acidiproducens, B. aeolius, B. aerius, B. aerophilus, B. agaradhaerens, B. aidingensis, B. akibai, B. alcalophilus, B. algicola, B. alkalinitrilicus, B. alkalisediminis, B. alkalitelluris, B. altit dinis, B. alveayuensis, B. amyloliquefaciens, B. anthracis, B. aquimaris, B. arsenicus, B. aryabhattai, B. asahii, B. atrophaeus, B. aurantiacus, B. azotoformans, B. badius, B. barbaricus, B. bataviensis, B. beijingensis, B. benzoevorans, B. beveridgei, B. bogoriensis, B. boroniphilus, B. butanolivorans, B. canaveralius, B. carboniphilus, B. cecembensis, B. cellulosilyiicus, B. cereus, B. chagannorensis, B. chungangensis, B. cibi, B. circulans, B. clarkii, B. clausii, B. coagulans, B. coahuilensis, B. cohnii, B. decisifrondis, B. decolorationis, B. drentensis, B. farraginis, B. faslidiosus, B. firmus, B. flexus, B. foraminis, B. fordii, B. fortis, B. fumarioli, B. funiculus, B. galactosidilyticus, B. galliciensis, B. gelatini, B. gibsonii, B. ginsengi, B. ginsengihumi, B. graminis, B. halmapalus, B. halochares, B. halodurans, B. hemicellulosilyticus, B. herbertsteinensis, B. horikoshi, B. horneckiae, B. horti, B. humi, B. hwajinpoensis, B. idriensis, B. indicus, B. infantis, B. infernus, B. isabeliae, B. isronensis, B. jeotgali, B. koreensis, B. korlensis, B. kribbensis, B. krul chiae, B. lehensis, B. lentus, B. licheniformis, B. litoralis, B. locisalis, B. luciferensis, B. luteolus, B. macauensis, B. macyae, B. mannanilyticus, B. marisflavi, B. marmarensis, B. massil-*

*iensis, B. megaterium, B. methanolicus, B. methylotrophicus, B. mojavensis, B. muralis, B. murimartini, B. mycoides, B. nanhaiensis, B. nanhaiisediminis, B. nealsonii, B. neizhouensis, B. niabensis, B. niacini, B. novalis, B. oceanisediminis, B. odysseyi, B. okhensis, B. okuhidensis, B. oleronius, B. oshimensis, B. panaciterrae, B. patagoniensis, B. persepolensis, B. plakortidis, B. pocheonensis, B. polygoni, B. pseudoalcaliphilus, B. pseudofirmus, B. pseudomycoides, B. psychrosaccharolyticus, B. pumilus, B. qingdaonensis, B. rigui, B. ruris, B. safensis, B. salarius, B. saliphilus, B. schlegelii, B. selenatarsenatis, B. selenitireducens, B. seohaeanensis, B. shackletonii, B. siamensis, B. simplex, B. siralis, B. smithii, B. soli, B. solisalsi, B. sonorensis, B. sporothermodurans, B. stratosphericus, B. subterraneus, B. subtilis, B. taeansis, B. tequilensis, B. thermantarcticus, B. thermoamylovorans, B. thermocloacae, B. thermolactis, B. thioparans, B. thuringiensis, B. tripoxylicola, B. tusciae, B. vallismortis, B. vedderi, B. vietnamensis, B. vireti, B. wakoensis, B. weihenstephanensis, B. xiaoxiensis*, and mixtures or blends thereof.

In some embodiments, the *Bacillus* isolate active against at least one plant pathogen, in particular the fungicidally and/or bactericidally active *Bacillus* isolate is *Bacillus subtilis, Bacillus amyloliquefaciens, Bacillus pumilus*, or a combination thereof.

*Paenibacillus* is a genus of low GC-content, endospore-forming, Gram-positive bacteria (Firmicutes). Bacteria belonging to this genus are prolific producers of industrially-relevant extracellular enzymes and antimicrobial substances, including non-ribosomal peptide classes like fusaricidin and polymyxin. Fusaricidins and polymyxins are known to have antimicrobial activity against various plant-pathogenic fungi and bacteria.

In certain embodiments, the *Paenibacillus* sp. strain is of the species *P. agarexedens, P. agaridevorans, P. alginolyticus, P. alkaliterrae, P. alvei, P. amylolyticus, P. anaericanus, P. antarcticus, P. assamensis, P. azoreducens, P. azotofixans, P. barcinonensis, P. borealis, P. brasiliensis, P. brassicae, P. campinasensis, P. chinjuensis, P. chitinolyticus, P. chondroitinus, P. cineris, P. cookie, P. curdlanolyticus, P. daejeonensis, P. dendritiformis, P. durum, P. ehimensis, P. elgii, P. favisporus, P. glucanolyticus, P. glycanilyticus, P. gordonae, P. graminis, P. granivorans, P. hodogayensis, P. illinoisensis, P. jamilae, P. kobensis, P. koleovorans, P. koreensis, P. kribbensis, P. lactis, P. larvae, P. lautus, P. lentimorbus, P. macerans, P. macquariensis, P. massiliensis, P. mendelii, P. motobuensis, P. naphthalenovorans, P. nematophilus, P. nov. spec. epiphyticus, P. odorifer, P. pabuli, P. peoriae, P. phoenicis, P. phyllosphaerae, P. polymyxa, P. polymyxa* ssp. *polymyxa, P. polymyxa* ssp. *plantarum, P. popilliae, P. pulvifaciens, P. rhizosphaerae, P. sanguinis, P. stellifer, P. taichungensis, P. terrae, P. thiaminolyticus, P. timonensis, P. tylopili, P. turicensis, P. validus, P. vortex, P. vulneris, P. wynnii* or *P. xylanilyticus*.

In another embodiment, the *Paenibacillus* sp. strain is *Paenibacillus polymyxa, Paenibacillus polymyxa* ssp. *polymyxa, Paenibacillus polymyxa* ssp. *plantarum, Paenibacillus nov.* spec. *epiphyticus, Paenibacillus terrae, Paenibacillus macerans*, or *Paenibacillus alvei*. In yet another embodiment, the *Paenibacillus* sp. strain is *Paenibacillus terrae*.

In certain aspects, the *Paenibacillus* sp. strain is a fusaricidin-producing *Paenibacillus* sp. strain.

Examples of fusaricidin-producing *Paenibacillus* sp. strains include but are not limited to *Paenibacillus polymyxa, Paenibacillus polymyxa* ssp. *polymyxa, Paenibacillus polymyxa* ssp. *plantarum, Paenibacillus nov.* spec. *epiphyticus, Paenibacillus terrae, Paenibacillus macerans*, and *Paenibacillus alvei*.

In one aspect, the *Paenibacillus* sp. strain is *Paenibacillus* sp. strain NRRL B-50972, *Paenibacillus* sp. strain NRRL B-67129, *Paenibacillus* sp. strain NRRL B-67304, *Paenibacillus* sp. strain NRRL B-67306, *Paenibacillus* sp. strain NRRL B-67615, or a mutant strain thereof which is active against at least one plant pathogen. It is most preferred that the *Paenibacillus* sp. strain is NRRL B-67615.

In some embodiments, any one of the following *Bacillus* strains is comprised in the composition of the present invention: *Bacillus subtilis* GB03 (available as KODIAK® from Bayer CropScience, U.S. EPA Reg. No. 264-970) or *Bacillus amyloliquefaciens* strain IN937a, or *Bacillus amyloliquefaciens* strain FZB42 (DSM 231179, product known as RHIZO VITAL® from ABITEP, DE); or *Bacillus subtilis* strain B3, or *Bacillus subtilis* strain D747, (products known as BACSTAR® from Etec Crop Solutions, NZ, or DOUBLE NICKEL® from Certis, US); *Bacillus subtilis* strain GB03 (Accession No. ATCC SD-1397, product known as KODIAK® from Bayer CropScience, DE, U.S. EPA Reg. No. 264-970) or *Bacillus subtilis* strain QST713/AQ713 (Accession No. NRRL B-21661, products known as SERENADE® from Bayer CropScience) or *Bacillus subtilis* strain AQ153 (ATCC Accession No. 55614) or *Bacillus* sp. strain AQ743 (Accession No. NRRL B-21665) or *Bacillus subtilis* strain DB 101, (products known as SHELTER™ from Dagutat Bio lab, ZA); or *Bacillus subtilis* strain DB 102, (products known as ARTEMIS™ from Dagutat Bio lab, ZA); or *Bacillus subtilis* strain MBI 600, (products known as SUBTILEX® from Becker Underwood, U.S.); or *Bacillus subtilis* strain QST30002/AQ30002 (Accession No. NRRL B-50421, cf. WO 2012/087980) or *Bacillus subtilis* strain QST30004/AQ30004 (Accession No. NRRL B-50455, cf. WO 2012/087980), or *Bacillus subtilis* strain BSY 1336, (products known as BIBONG® from Kuanghwa Chemical Co. Ltd., Taiwan); or *Bacillus subtilis* strain BD 170. (products known as BIOPRO® from Adermatt Biocontrol, Europe); or *Bacillus subtilis* strain B2g, (products known as PHYTOVIT® from Prophyta, Germany); or *Bacillus subtilis* strain BSF4, (products known as BSF4® from Agribiotec, Italy); or *Bacillus subtilis* strain B246, (products known as AVOGREEN® from the University of Pretoria in South Africa); *Bacillus* sp. strain GB99 or *Bacillus* sp. strain GB122 (products known as BIOYIELD®); or *Bacillus subtilis* strain KTSB, (products known as FOLIACTIVE® from Donaghys, New Zealand); or *Bacillus subtilis* strain Antumavida or *Bacillus subtilis* strain Vilcún, (products known as NACILLUS® from Bio Insumos *Nativa* Ltda., Chile); or *Bacillus subtilis* strain BSY1336, (products known as BIOBAC® from Bion Tech Inc., Taiwan); or *Bacillus subtilis* strain WG6-14, (products known as BACTOPHYT® from Novosibirsk, Russia); or *Bacillus subtilis* strain KTS, (products known as KILL DEW® DP from Krishi-Mitra, Turkey); or *Bacillus subtilis* strain MBI 600, (products known as BOTOKILLER® from Idemitsu Kosan Co., Korea); or *Bacillus amyloliquefaciens* strain BS1b, (products known as TRIPLEX® from BioStart Limited, New Zealand); or *Bacillus subtilis* strain BS-K423, (products known as UNGSAMI® from Shin Young Agro Co., Ltd., Korea); or *Bacillus subtilis* strain PB6, (products known as CLOSTAT® from Kemin, USA); or *Bacillus subtilis* strain KPS46; or *Bacillus subtilis* strain C06; or *Bacillus subtilis* strain JKK 238; or *Bacillus subtilis* strain EB120; or *Bacillus subtilis* strain KB401.

A sample of *Bacillus subtilis* QST713 has been deposited with the Agricultural Research Service Culture Collection located at the National Center for Agricultural Utilization Research, Agricultural Research Service, U.S. Department of Agriculture, 1815 North University Street, Peoria, IL 61604, U.S.A., under the Budapest Treaty on Mar. 7, 1997, and has been assigned Accession Number NRRL B-21661. Samples of QST30002 (aka AQ30002) and QST30004 (aka AQ30004) have been deposited with the Agricultural Research Service Culture Collection under the Budapest Treaty on Oct. 5, 2010, and Dec. 6, 2010, respectively. QST30002 has been assigned Accession Number NRRL B-50421, and QST30004 has been assigned the following Accession Number NRRL B-50455.

In a more preferred embodiment, said biological control agent is selected from the group consisting of (B1.1) *Bacillus subtilis* strain QST713/AQ713. (B1.2) *Bacillus pumilus* strain QST2808. (B1.3) *Bacillus pumilus* strain GB34, (B1.4) *Bacillus pumilus* strain BU F-33. (B1.5) *Bacillus amyloliquefaciens* strain D747, (B1.6) *Bacillus subtilis* Y1336, (B1.7) *Bacillus amyloliquefaciens* strain MBI 600, (B1.8) *Bacillus subtilis* strain GB03, (B1.9) *Bacillus subtilis* var. *amyloliquefaciens* strain FZB24, (B1.10) *Bacillus mycoides* isolate J, (B1.11) *Bacillus licheniformis* strain SB3086, and (B1.12) a *Paenibacillus* sp. strain having Accession No. NRRL B-50972 or Accession No. NRRL B-67129 and/or a mutant of these strains having all the identifying characteristics of the respective strain and/or a metabolite produced by the respective strain which is active against at least one plant pathogen.

It is most preferred that said biological control agent is *B. subtilis* QST713 and/or a mutant and/or metabolite thereof which is active against at least one plant pathogen.

At the time of filing U.S. patent application Ser. No. 09/074,870, in 1998, which relates to QST713, the strain was designated as *Bacillus subtilis* based on classical, physiological, biochemical and morphological methods. Taxonomy of the *Bacillus* species has evolved since then, especially in light of advances in genetics and sequencing technologies, such that species designation is based largely on DNA sequence rather than the methods used in 1998. After aligning protein sequences from *B. amyloliquefaciens* FZB42, *B. subtilis* 168 and QST713, approximately 95% of proteins found in *B. amyloliquefaciens* FZB42 are 85% or greater identical to proteins found in QST713; whereas only 35% of proteins in *B. subtilis* 168 are 85% or greater identical to proteins in QST713. However, even with the greater reliance on genetics, there is still taxonomic ambiguity in the relevant scientific literature and regulatory documents, reflecting the evolving understanding of *Bacillus* taxonomy over the past 15 years. For example, a pesticidal product based on *B. subtilis* strain FZB24, which is as closely related to QST713 as FZB42, is classified in documents of the U.S. EPA as *B. subtilis* var. *amyloliquefaciens*. Due to these complexities in nomenclature, this particular *Bacillus* species is variously designated, depending on the document, as *B. subtilis, B. amyloliquefaciens*, and *B. subtilis* var. *amyloliquefaciens*. Therefore, we have retained the *B. subtilis* designation of QST713 rather than changing it to *B. amyloliquefaciens*, as would be expected currently based solely on sequence comparison and inferred taxonomy.

Suitable formulations of the *Bacillus subtilis* strain QST713 are commercially available under the trade names SERENADE®, SERENADE® ASO, SERENADE SOIL® and SERENADE® MAX from Bayer CropScience LP, North Carolina, U.S.A.

The SERENADE® product (U.S. EPA Registration No. 69592-12) contains *Bacillus subtilis* strain QST713 and many different lipopeptides that work synergistically to destroy disease pathogens and provide antimicrobial activity. The SERENADE® product is used to protect plants such as vegetables, fruit, nut and vine crops against diseases such as Fire Blight, Botrytis, Sour Rot, Rust, Sclerotinia, Powdery Mildew, Bacterial Spot and White Mold. The SERENADE® products are available as either liquid or dry formulations which can be applied as a foliar and/or soil treatment. Copies of U.S. EPA Master Labels for the SERENADE® products, including SERENADE® ASO, SERENADE® MAX, and SERENADE SOIL®, are publicly available through National Pesticide Information Retrieval System's (NPIRS®) US EPA/OPP Pesticide Product Label System (PPLS).

SERENADE® ASO (Aqueous Suspension-Organic) contains 1.34% of dried QST713 as an active ingredient and 98.66% of other ingredients. SERENADE® ASO is formulated to contain a minimum of $1 \times 10^9$ cfu/g of QST713 while the maximum amount of QST713 has been determined to be $3.3 \times 10^{10}$ cfu/g. Alternate commercial names for SERENADE® ASO include SERENADE® BIOFUNGICIDE, SERENADE SOIL® and SERENADE® GARDEN DISEASE. For further information, see the U.S. EPA Master Labels for SERENADE® ASO dated Jan. 4, 2010, and SERENADE SOIL®, each of which is incorporated by reference herein in its entirety.

SERENADE® MAX contains 14.6% of dried QST713 as an active ingredient and 85.4% of other ingredients. SERENADE® MAX is formulated to contain a minimum of $7.3 \times 10^9$ cfu/g of QST713 while the maximum amount of QST713 has been determined to be $7.9 \times 10^{10}$ cfu/g. For further information, see the U.S. EPA Master Label for SERENADE® MAX, which is incorporated by reference herein in its entirety.

SERENADE® OPTIMUM (or OPTI) contains 26.2% of dried QST713 as an active ingredient and 73.8% of other ingredients. SERENADE® OPTIMUM (or OPTI) is formulated to contain a minimum of $1.31 \times 10^{10}$ cfu/g of QST713. For further information, see the U.S. EPA Master Label for SERENADE® OPTIMUM (or OPTI), which is incorporated by reference herein in its entirety.

A suitable formulation of *Bacillus pumilus* QST2808 is commercially available under the tradename of SONATA® (EPA Reg. No. 264-1153), contains 1.38% of dried QST2808, and is formulated to contain a minimum of $1 \times 10^9$ cfu/g of QST2808. Another suitable formulation of *Bacillus pumilus* QST2808 is commercially available under the tradename of BALLAD® PLUS (EPA Reg. No. 69592-13), contains 1.38% of dried QST2808, and is formulated to contain a minimum of $1 \times 10^{10}$ cfu/g of QST2808.

The term "mutant" refers to a genetic variant derived from the respective strain, such as from *Bacillus subtilis* QST713. In one embodiment, the mutant has one or more or all the identifying (functional) characteristics of that strain. In a particular instance, the mutant or a fermentation product thereof controls (as an identifying functional characteristic) fungi at least as well as the parent strain. Such mutants may be genetic variants having a genomic sequence that has greater than about 85%, greater than about 90%, greater than about 95%, greater than about 98%, or greater than about 99% sequence identity to the parent strain. Mutants may be obtained by treating cells of the parent strain with chemicals or irradiation or by selecting spontaneous mutants from a population of cells treated in this way (such as phage resistant or antibiotic resistant mutants) or by other means well known to those practiced in the art.

The mutant strain of *Bacillus subtilis* QST713 can be any mutant strain that has one or more or all the identifying characteristics of *Bacillus subtilis* QST713 and in particular fungicidal and/or bactericidal activity that is comparable or better than that of *Bacillus subtilis* QST713.

Other *Bacillus* strains capable of producing lipopeptides may be used in the present invention. For example, *Bacillus amyloliquefaciens* strain D747 (available as BACSTAR® from Etec Crop Solutions, NZ and also available as DOUBLE NICKEL55™ from Certis, US); *Bacillus subtilis* MBI600 (available as SUBTILEX® from Becker Underwood, US EPA Reg. No. 71840-8); *Bacillus subtilis* Y1336 (available as BIOBAC® WP from Bion-Tech, Taiwan, registered as a biological fungicide in Taiwan under Registration Nos. 4764, 5454, 5096 and 5277); *Bacillus amyloliquefaciens*, in particular strain FZB42 (available as RHIZOVITAL® from ABITEP, DE); *Bacillus subtilis* var. *amyloliquefaciens* FZB24 is available from Novozymes Biologicals Inc. (Salem, Virginia) or Syngenta Crop Protection, LLC (Greensboro, North Carolina) as the fungicide TAEGRO® or TAEGRO® ECO (EPA Registration No. 70127-5), and *Bacillus subtilis* EA-CB0015 and *Bacillus amyloliquefaciens* EA-CB0959 (described in International Publication No. WO/2014/178032) are all *Bacillus* strains capable of producing lipopeptides that may be used in the present invention.

A mutant of FZB24 that was assigned Accession No. NRRL B-50349 by the Agricultural Research Service Culture Collection is also described in U.S. Patent Publication No. 2011/0230345. *Bacillus amyloliquefaciens* FZB42 is available from ABiTEP GMBH, Germany, as the plant strengthening product RHIZOVITAL®; FZB42 is also described in European Patent Publication No. EP2179652 and also in Chen, et al., "Comparative Analysis of the Complete Genome Sequence of the Plant Growth-Promoting Bacterium *Bacillus amyloliquefaciens* FZB42," Nature Biotechnology, Volume 25, Number 9 (September 2007). Mutants of FZB42 are described in International Publication No. WO 2012/130221, including *Bacillus amyloliquefaciens* ABI01, which was assigned Accession No. DSM 10-1092 by the DSMZ-German Collection of Microorganisms and Cell Cultures.

In the course of the present invention, it has surprisingly been found that the action of a bacterium active against at least one plant pathogen, in particular a fungicidally and/or bactericidally active bacterium, in particular bacteria of the genus *Bacillus* or *Paenibacillus*, more particularly bacteria of the species *Bacillus subtilis*, can be enhanced by co-application of a fatty acid or derivative thereof according to the invention. Fatty acids and derivatives thereof are themselves also considered to be biological plant protection agents and have obtained market authorization as such, thus the combination of both agents results in an efficient measure for biological plant protection which can be similar to the application of chemical plant protection agents.

In one embodiment, said one or more fatty acids or derivatives thereof are selected from unsaturated and saturated C14-20 fatty acids, salts thereof, esters thereof or mixtures of any of the foregoing. The one or more fatty acids or derivatives thereof may also be selected from unsaturated and saturated unsaturated and saturated C16-20 fatty acids, and salts or esters thereof.

Preferably, the one or more fatty acids or derivatives thereof comprises two or more fatty acids selected from C16:0 fatty acids, C16:1 fatty acids, C18:0 fatty acid, C18:1 fatty acids, C18:2 fatty acids, and C18:3 fatty acids, or salts thereof (for instance potassium or sodium salts).

For instance, the one or more fatty acids may comprise the following fatty acids in the following proportions:
C16 fatty acids from 1 to 10 wt %;
C16:1 fatty acids from 0 to 5 wt %;
C18:1 fatty acids from 60 to 94 wt %; and
C18:2 fatty acids from 5 to 20 wt %.

Often, the one or more fatty acids comprise the following fatty acids in the following proportions:
C16 fatty acids from 3 to 7 wt %;
C16:1 fatty acids from 0 to 4 wt %;
C18:1 fatty acids from 70 to 89 wt %; and
C18:2 fatty acids from 8 to 18 wt %.

Fatty acid amounts in wt % as used in the present application are relative to the total amount of fatty acids in the composition.

The one or more fatty acids or derivatives thereof may comprise:
sodium or potassium salts of C16 fatty acids in an amount of from 1 to 10 wt %;
sodium or potassium salts of C16:1 fatty acids in an amount of from 0 to 5 wt %;
sodium or potassium salts of C18:1 fatty acids in an amount of from 60 to 94 wt %;
and sodium or potassium salts of C18:2 fatty acids in an amount of from 5 to 20 wt %.

Often, the one or more fatty acids comprise the following fatty acids in the following proportions:
sodium or potassium salts of C16 fatty acids in an amount of from 3 to 7 wt %;
sodium or potassium salts of C16:1 fatty acids in an amount of from 0 to 4 wt %;
sodium or potassium salts of C18:1 fatty acids in an amount of from 70 to 89 wt %;
and sodium or potassium salts of C18:2 fatty acids in an amount of from 8 to 18 wt %.

It is preferred that the one or more fatty acid or derivative thereof, in particular sodium or potassium salts comprise C18, C18:1, C18:2 and C18:3 fatty acids or derivatives thereof which amount to at least 90 wt.-% of the total fatty acid content, preferably at least 95 wt.-%, possibly up to 97 wt.-%.

In particular, the one or more fatty acids or derivatives thereof may comprise one or more of linoleic acid (C18:2), y-linolenic acid (C18:3), palmitoleic acid (C16:1), vaccenic acid (C18:1), paullinic acid (C20:1), oleic acid (C18:1), elaidic acid (Ctrans-18:1) or derivatives thereof or a mixture of any of the foregoing.

In one preferred embodiment, the one or more fatty acids or derivatives thereof comprises oleic acid or a salt thereof. The one or more fatty acid or derivatives thereof typically comprise at least 70 wt % of oleic acid or a salt thereof, for instance a potassium salt of oleic acid (potassium oleate). More preferably, in this embodiment, said one or more fatty acid is a C16-C20 fatty acid or derivative thereof. It is even more preferred that the one or more fatty acid is not derivatized and comprises oleic acid. In an alternative much preferred embodiment, the fatty acids are derivatives in the form of potassium salts.

Whereas up to 97% of the one or more fatty acids or derivatives thereof are in the range of C14-C20, minor percentages of fatty acids or derivatives thereof may be C12, C13, C21 or C22 fatty acids or derivatives thereof. It is even more preferred that at least 75 wt.-%, preferably at least 80 wt.-%, more preferably at least 85 wt.-% and most prepferably at least 90 wt.-% of one or more fatty acids or derivatives thereof are C18:1, C18:2 and/or C18:3. In this embodiment, the remaining percentage of fatty acids or derivatives thereof are in the range of C12 to C18, such as C14, C16, C16:1, C17 and C18, and C19 to C22.

In one embodiment, no fatty acids or derivatives thereof in the range below C12 or above C22 are present.

The most preferred embodiments are those further comprising a metal complex selected from the group consisting of copper mandelate, copper salicylate, copper anthranilate, copper 2,6-dihydroxybenzoate, copper benzenesulphonate, zinc mandelate, zinc salicylate, zinc anthranilate, zinc benzenesulphonate, iron mandelate, iron salicylate, iron 2,6-dihydroxybenzoate, silver mandelate, silver anthranilate, silver benzenesulphonate, magnesium mandelate, magnesium 2,6-dihydroxybenzoate, and mixtures thereof, in addition to a C16-C20 fatty acid or derivative thereof, said fatty acid or derivative thereof being a mixture comprising at least 70 wt % of potassium oleate, on the weight of the derivative of C16-C20 fatty acid.

In another preferred embodiment, the one or more fatty acids or derivatives thereof comprise one or more metal or alkali metal salts of fatty acids. Such metal or alkali metal salts of fatty acids are obtainable by a process comprising (a) Providing a vegetable oil; (b) Hydrolyzing triglycerides in the vegetable oil; (c) Extracting fatty acids from the hydrolyzed vegetable oil; and (d) Forming the metal or alkali metal salts of the extracted fatty acids. Preferably the alkali metal is potassium.

The vegetable oil is an oil or fat derived from a plant or animal and may comprise triglycerides, lipids, and fatty acids. Examples of oils derived from plants include apple seed oil, argan oil, coconut oil, colza oil, canola oil, corn oil, cottonseed oil, grape seed oil, hazelnut oil, macadamia oil, mustard oil, niger seed oil, olive oil, palm kernel oil, peanut oil, poppyseed oil, pumpkin seed oil, ramtil oil, rice bran oil, safflower oil, soybean oil, sesame oil, sunflower oil, tamarind seed oil, tea seed oil and walnut oil. Examples of oils derived from animals include fats derived from animal rendering. Preferably, the vegetable oil is olive oil.

Hydrolysing triglycerides in the vegetable oil typically comprises treating the vegetable oil with an aqueous acid, for instance aqueous sulfuric acid but may also be effected using other means such as heat treatment. The treated vegetable oil may be heated.

Extracting fatty acids from the hydrolysed vegetable oil may be done by any suitable method as are well known to the skilled person, for instance evaporation, solvent extraction, liquid-liquid extraction or chromatography.

Forming the metal or alkali metal salts of the extracted fatty acids may be done by any suitable method are well known to the skilled person. Typically, this comprises treating the fatty acids with a base comprising the metal or alkali metal, e.g. a metal or alkali metal hydroxide such as KOH or NaOH. The metal is often an alkali metal, e.g. Li, Na, K or Rb, preferably K, or an alkali earth metal, e.g. Mg, Ca, Sr or Ba.

In some cases, the fatty acid derivatives may be formed starting simply from a composition comprising the fatty acids. Thus, the fatty acid component may be produced by providing one or more fatty acids and forming the metal or alkali metal salts of the extracted fatty acids.

In some embodiments, said fatty acid derivatives are salts of lithium, sodium, potassium, magnesium, calcium, or a mixture thereof.

In a more preferred embodiment, the fatty acid derivatives are alkali metal salts of fatty acids, preferably potassium salts of fatty acids.

In an alternative preferred embodiment, the fatty acid is not derivatized.

The total amount of the one or more fatty acids or derivatives thereof depends on the intended use and is often from 0.01 to 10 vol % for ready-to-use formulations, or from 0.5 to 7 vol %. For instance, the concentration of the fatty acid component may be from 0.5 to 30 g/L or from 1 to 20 g/L. Preferably, the concentration of the fatty acid component is from 3 to 15 g/L, for instance from 7 to 12 g/L. In concentrated formulations, the total amount of the one or more fatty acids or derivatives thereof may range between 20 and 60 wt.-%, such as between 25 and 55 wt.-%.

It is to be noted that the percentage of unsaturated fatty acids in the component of the composition comprising one or more fatty acids or derivative thereof is at least 30% of the total fatty acids, preferably at least 40%, more preferably even more as described above. Whereas many bacteria of the genus *Bacillus* or *Paenibacillus* are able to synthesize fatty acids themselves for various purposes, most notably for incorporation into their membrane, the percentage of unsaturated fatty acids to be produced by such bacteria under normal growth conditions is up to 28% of the total fatty acids.

The pH value of the composition comprising the one or more fatty acids or derivatives thereof is preferably in the alkaline range, such as at least 8.0. Preferably, the pH is at least 8.5 or even above, preferably in the range between 8.5 and 9.2.

If the bacterium active against at least one plant pathogen comprises spores, the concentration of spores is typically from $1\times10^6$ to $1\times10^{12}$ cfu/g. The spore concentration may be from $1\times10^8$ to $5\times10^{11}$ cfu/g. The spore concentration is preferably between $5\times10^8$ and $1\times10^{11}$ cfu/g, more preferably between $1\times10^9$ and $8\times10^{10}$ cfu/g.

At the concentrations given above, the composition is typically in a form suitable for application to plants. The composition may of course also be presented in a form suitable for storage or transport. In such cases, the concentration is typically much higher. For instance, the concentration of the fatty acid component may be greater than 100 ml/L or greater than 500 ml/L. The spore concentration may be from 10 to 1 ml-1.

The composition of the invention may be made by any suitable method. This usually comprises mixing components (a) and (b) in the desired proportion.

The present invention provides an agrochemical product comprising: (a) one or more fatty acids or derivatives thereof; and (b) a strain, culture, culture filtrate or spores of a bacterium active against at least one plant pathogen, all as defined herein, which strain, culture, culture filtrate or spores directly or indirectly (i) inhibits the growth or reproduction of plant pathogens or (ii) kills plant pathogens, wherein components (a) and (b) are formulated for simultaneous or separate treatment of a locus.

In addition to components (a) and (b), the composition typically further comprises a solvent, which is usually water, but may also be methanol, ethanol, n-propanol, iso-propanol, n-butanol, isobutanol, allyl alcohol, 1,2-propylene glycol, 1,3-propylene glycol, 1,2-ethylene glycol, polyethylene glycol (PEG), benzyl alcohol, glycerol, and mixtures thereof. Preferably, the composition comprises a mixture of water with one of the above solvents.

In a preferred embodiment, item b) of the composition comprises 2-4 wt % of a metal complex selected from the group consisting of copper mandelate, copper salicylate, copper anthranilate, copper 2,6-dihydroxybenzoate, copper benzenesulphonate, zinc mandelate, zinc salicylate, zinc anthranilate, zinc benzenesulphonate, iron mandelate, iron salicylate, iron 2,6-dihydroxybenzoate, silver mandelate, silver anthranilate, silver benzenesulphonate, magnesium mandelate, magnesium 2,6-dihydroxybenzoate, and mixtures thereof, 75-85 wt % of a salt of oleic acid, and the remainder of b) being a solvent.

The composition according to the present invention may additionally comprise at least one auxiliary selected from the group consisting of extenders, spontaneity promoters, carriers, emulsifiers, dispersants, frost protectants, thickeners and adjuvants.

Accordingly, in one aspect of the present invention a formulation and application forms prepared from it, are provided as crop protection agents, such as drench, drip and spray liquors, comprising the composition of the invention. The application forms may comprise further crop protection agents and/or pesticidal agents, and/or activity-enhancing adjuvants such as penetrants, examples being vegetable oils such as, for example, rapeseed oil, sunflower oil, mineral oils such as, for example, liquid paraffins, alkyl esters of vegetable fatty acids, such as rapeseed oil or soybean oil methyl esters, or alkanol alkoxylates, and/or spreaders such as, for example, alkylsiloxanes and/or salts, examples being organic or inorganic ammonium or phosphonium salts, examples being ammonium sulphate or diammonium hydrogen phosphate, and/or retention promoters such as dioctyl sulphosuccinate or hydroxypropylguar polymers and/or humectants such as glycerol and/or fertilizers such as ammonium, potassium or phosphorous fertilizers, for example.

Examples of typical formulations include water-soluble liquids (SL), emulsifiable concentrates (EC), emulsions in water (EW), suspension concentrates (SC, SE, FS, OD), water-dispersible granules (WG), granules (GR) and capsule concentrates (CS); these and other possible types of formulation are described, for example, by Crop Life International and in Pesticide Specifications, Manual on Development and Use of FAO and WHO Specifications for Pesticides, FAO Plant Production and Protection Papers—173, prepared by the FAO/WHO Joint Meeting on Pesticide Specifications, 2004, ISBN: 9251048576. The formulations may comprise active agrochemical compounds other than one or more active compounds of the invention.

The formulations or application forms of the composition in question preferably comprise auxiliaries, such as extenders, solvents, spontaneity promoters, carriers, emulsifiers, dispersants, frost protectants, biocides, thickeners and/or other auxiliaries, such as adjuvants, for example. An adjuvant in this context is a component which enhances the biological effect of the formulation, without the component itself having a biological effect. Examples of adjuvants are agents which promote the retention, spreading, attachment to the leaf surface, or penetration.

These formulations are produced in a known manner, for example by mixing the active compounds with auxiliaries such as, for example, extenders, solvents and/or solid carriers and/or further auxiliaries, such as, for example, surfactants. The formulations are prepared in suitable plants or else before or during the application.

Suitable for use as auxiliaries are substances which are suitable for imparting to the formulation of the active compound or the application forms prepared from these formulations (such as, e.g., usable crop protection agents, such as spray liquors or seed dressings) particular properties such as certain physical, technical and/or biological properties.

Suitable extenders are, for example, water, polar and nonpolar organic chemical liquids, for example from the classes of the aromatic and non-aromatic hydrocarbons (such as paraffins, alkylbenzenes, alkylnaphthalenes, chlorobenzenes), the alcohols and polyols (which, if appropriate, may also be substituted, etherified and/or esterified), the ketones (such as acetone, cyclohexanone), esters (including fats and oils) and (poly) ethers, the unsubstituted and substituted amines, amides, lactams (such as N-alkylpyrrolidones) and lactones, the sulphones and sulphoxides (such as dimethyl sulphoxide).

If the extender used is water, it is also possible to employ, for example, organic solvents as auxiliary solvents. Essentially, suitable liquid solvents are: aromatics such as xylene, toluene or alkylnaphthalenes, chlorinated aromatics and chlorinated aliphatic hydrocarbons such as chlorobenzenes, chloroethylenes or methylene chloride, aliphatic hydrocarbons such as cyclohexane or paraffins, for example petroleum fractions, mineral and vegetable oils, alcohols such as butanol or glycol and also their ethers and esters, ketones such as acetone, methyl ethyl ketone, methyl isobutyl ketone or cyclohexanone, strongly polar solvents such as dimethylformamide and dimethyl sulphoxide, and also water.

In principle it is possible to use all suitable solvents. Suitable solvents are, for example, aromatic hydrocarbons, such as xylene, toluene or alkylnaphthalenes, for example, chlorinated aromatic or aliphatic hydrocarbons, such as chlorobenzene, chloroethylene or methylene chloride, for example, aliphatic hydrocarbons, such as cyclohexane, for example, paraffins, petroleum fractions, mineral and vegetable oils, alcohols, such as methanol, ethanol, isopropanol, butanol or glycol, for example, and also their ethers and esters, ketones such as acetone, methyl ethyl ketone, methyl isobutyl ketone or cyclohexanone, for example, strongly polar solvents, such as dimethyl sulphoxide, and water.

All suitable carriers may in principle be used. Suitable carriers are in particular: for example, ammonium salts and ground natural minerals such as kaolins, clays, talc, chalk, quartz, attapulgite, montmorillonite or diatomaceous earth, and ground synthetic minerals, such as finely divided silica, alumina and natural or synthetic silicates, resins, waxes and/or solid fertilizers. Mixtures of such carriers may likewise be used. Carriers suitable for granules include the following: for example, crushed and fractionated natural minerals such as calcite, marble, pumice, sepiolite, dolomite, and also synthetic granules of inorganic and organic meals, and also granules of organic material such as sawdust, paper, coconut shells, maize cobs and tobacco stalks.

Liquefied gaseous extenders or solvents may also be used. Particularly suitable are those extenders or carriers which at standard temperature and under standard pressure are gaseous, examples being aerosol propellants, such as halogenated hydrocarbons, and also butane, propane, nitrogen and carbon dioxide.

Examples of emulsifiers and/or foam-formers, dispersants or wetting agents having ionic or nonionic properties, or mixtures of these surface-active substances, are salts of polyacrylic acid, salts of lignosulphonic acid, salts of phenolsulphonic acid or naphthalenesulphonic acid, polycondensates of ethylene oxide with fatty alcohols or with fatty acids or with fatty amines, with substituted phenols (preferably alkylphenols or arylphenols), such as polyoxyethylene sorbitan monooleate, salts of sulphosuccinic esters, taurine derivatives (preferably alkyltaurates), phosphoric esters of polyethoxylated alcohols or phenols, fatty acid esters of polyols, and derivatives of the compounds containing sulphates, sulphonates and phosphates, examples being alkylaryl polyglycol ethers, alkylsulphonates, alkyl sulphates, arylsulphonates, protein hydrolysates, lignin-sulphite waste liquors and methylcellulose. The presence of a surface-active substance is advantageous if one of the active compounds and/or one of the inert carriers is not soluble in water and if application takes place in water.

Further auxiliaries that may be present in the formulations and in the application forms derived from them include colorants such as inorganic pigments, examples being iron oxide, titanium oxide, Prussian Blue, and organic dyes, such as alizarin dyes, azo dyes and metal phthalocyanine dyes, and nutrients and trace nutrients, such as salts of iron, manganese, boron, copper, cobalt, molybdenum and zinc.

Stabilizers, such as low-temperature stabilizers, preservatives, antioxidants, light stabilizers or other agents which improve chemical and/or physical stability may also be present. Additionally present may be foam-formers or defoamers.

Furthermore, the formulations and application forms derived from them may also comprise, as additional auxiliaries, stickers such as carboxymethylcellulose, natural and synthetic polymers in powder, granule or latex form, such as gum arabic, polyvinyl alcohol, polyvinyl acetate, and also natural phospholipids, such as cephalins and lecithins, and synthetic phospholipids. Further possible auxiliaries include mineral and vegetable oils.

There may possibly be further auxiliaries present in the formulations and the application forms derived from them. Examples of such additives include fragrances, protective colloids, binders, adhesives, thickeners, thixotropic substances, penetrants, retention promoters, stabilizers, sequestrants, complexing agents, humectants and spreaders. Generally speaking, the active compounds may be combined with any solid or liquid additive commonly used for formulation purposes.

Suitable retention promoters include all those substances which reduce the dynamic surface tension, such as dioctyl sulphosuccinate, or increase the viscoelasticity, such as hydroxypropylguar polymers, for example.

Suitable penetrants in the present context include all those substances which are typically used in order to enhance the penetration of active agrochemical compounds into plants. Penetrants in this context are defined in that, from the (generally aqueous) application liquor and/or from the spray coating, they are able to penetrate the cuticle of the plant and thereby increase the mobility of the active compounds in the cuticle. This property can be determined using the method described in the literature (Baur, et al., 1997, Pesticide Science 51, 131-152). Examples include alcohol alkoxylates such as coconut fatty ethoxylate (10) or isotridecyl ethoxylate (12), fatty acid esters such as rapeseed or soybean oil methyl esters, fatty amine alkoxylates such as tallowamine ethoxylate (15), or ammonium and/or phosphonium salts such as ammonium sulphate or diammonium hydrogen phosphate, for example.

The present invention also relates to a seed treated or coated with the composition according the invention.

The control of phytopathogens by treating the seed of plants has been known for a long time and is a subject of continual improvements. Nevertheless, the treatment of seed entails a series of problems which cannot always be solved in a satisfactory manner. Thus, it is desirable to develop methods for protecting the seed and the germinating plant that remove the need for, or at least significantly reduce, the additional delivery of crop protection compositions in the course of storage, after sowing or after the emergence of the plants.

The present invention therefore also relates in particular to a method for protecting seed and germinating plants from attack by plant pathogens, by treating the seed with the composition of the present invention. The method of the invention for protecting seed and germinating plants from attack by plant pathogens encompasses a method in which the seed is treated simultaneously in one operation with the composition according to the invention, and optionally at least one further fungicide, bactericide and/or insecticide. It also encompasses a method in which the seed is treated at different times, i.e. sequentially, with the compounds according to item a) and item b), and optionally the at least one fungicide, bactericide and/or the at least one insecticide.

The invention likewise relates to the use of the composition of the invention for treating seed for the purpose of protecting the seed and the resultant plant against fungal phytopathogens.

The invention also relates to seed which at the same time has been treated with the compounds according to item a) and item b), and optionally at least one fungicide, bactericide and/or the at least one insecticide. The invention further relates to seed which has been treated at different times with the compounds according to item a) and item b) and optionally the at least one fungicide, bactericide and/or the at least one insecticide. In the case of seed which has been treated at different times with the compounds according to item a) and item b), and optionally the at least one fungicide, bactericide and/or the at least one insecticide, the individual active ingredients in the composition of the invention may be present in different layers on the seed.

Furthermore, the invention relates to seed which, following treatment with the composition of the invention, is subjected to a film-coating process in order to prevent dust abrasion of the seed.

One of the advantages of the present invention is that the treatment of the seed with these compositions provides protection at least from phytopathogens not only to the seed itself but also to the plants originating from the seed, after they have emerged. In this way, it may not be necessary to treat the crop directly at the time of sowing or shortly thereafter.

A further advantage is to be seen in the fact that, through the treatment of the seed with composition of the invention, germination and emergence of the treated seed may be promoted.

It is likewise considered to be advantageous that the composition of the invention may also be used, in particular, on transgenic seed.

It is also stated that the composition of the invention may be used in combination with agents of the signaling technology, as a result of which, for example, colonization with symbionts is improved, such as rhizobia, mycorrhiza and/or endophytic bacteria, for example, is enhanced, and/or nitrogen fixation is optimized.

The compositions of the invention are suitable for protecting seed of any variety of plant which is used in agriculture, in greenhouses, in forestry or in horticulture. More particularly, the seed in question is that of cereals (e.g., wheat, barley, rye, oats and millet), maize, cotton, soybeans, rice, potatoes, sunflower, coffee, tobacco, canola, oilseed rape, beets (e.g., sugar beet and fodder beet), peanuts, vegetables (e.g., tomato, cucumber, bean, brassicas, onions and lettuce), fruit plants, lawns and ornamentals. Particularly important is the treatment of the seed of cereals (such as wheat, barley, rye and oats) maize, soybeans, cotton, canola, oilseed rape and rice.

As already mentioned above, the treatment of transgenic seed with the composition of the invention is particularly important. The seed in question here is that of plants which generally contain at least one heterologous gene that controls the expression of a polypeptide having, in particular, insecticidal and/or nematicidal properties. These heterologous genes in transgenic seed may come from microorganisms such as *Bacillus, Rhizobium, Pseudomonas, Serratia, Trichoderma, Clavibacter, Glomus* or *Gliocladium*. The present invention is particularly suitable for the treatment of transgenic seed which contains at least one heterologous gene from *Bacillus* sp. With particular preference, the heterologous gene in question comes from *Bacillus thuringiensis*.

For the purposes of the present invention, the composition of the invention is applied alone or in a suitable formulation to the seed. The seed is preferably treated in a condition in which its stability is such that no damage occurs in the course of the treatment. Generally speaking, the seed may be treated at any point in time between harvesting and sowing. Typically, seed is used which has been separated from the plant and has had cobs, hulls, stems, husks, hair or pulp removed. Thus, for example, seed may be used that has been harvested, cleaned and dried to a moisture content of less than 15% by weight. Alternatively, seed can also be used that after drying has been treated with water, for example, and then dried again.

When treating seed it is necessary, generally speaking, to ensure that the amount of the composition of the invention, and/or of other additives, that is applied to the seed is selected such that the germination of the seed is not adversely affected, and/or that the plant which emerges from the seed is not damaged. This is the case in particular with active ingredients which may exhibit phytotoxic effects at certain application rates.

The compositions of the invention can be applied directly, in other words without comprising further components and without having been diluted. As a general rule, it is preferable to apply the compositions in the form of a suitable formulation to the seed. Suitable formulations and methods for seed treatment are known to the skilled person and are described in, for example, the following documents: U.S. Pat. Nos. 4,272,417 A; 4,245,432 A; 4,808,430 A; 5,876,739 A; U.S. Patent Publication No. 2003/0176428 A1; WO 2002/080675 A1; WO 2002/028186 A2.

The combinations which can be used in accordance with the invention may be converted into the customary seed-dressing formulations, such as solutions, emulsions, suspensions, powders, foams, slurries or other coating compositions for seed, and also ULV formulations.

These formulations are prepared in a known manner, by mixing composition with customary adjuvants, such as, for example, customary extenders and also solvents or diluents, colorants, wetters, dispersants, emulsifiers, antifoams, preservatives, secondary thickeners, stickers, gibberellins, and also water.

Colorants which may be present in the seed-dressing formulations which can be used in accordance with the invention include all colorants which are customary for such purposes. In this context it is possible to use not only pigments, which are of low solubility in water, but also water-soluble dyes. Examples include the colorants known under the designations Rhodamin B, C.I. Pigment Red 112 and C.I. Solvent Red 1.

Wetters which may be present in the seed-dressing formulations which can be used in accordance with the invention include all of the substances which promote wetting and which are customary in the formulation of active agrochemical ingredients. Use may be made preferably of alkylnaphthalenesulphonates, such as diisopropyl- or diisobutyl-naphthalenesulphonates.

Dispersants and/or emulsifiers which may be present in the seed-dressing formulations which can be used in accordance with the invention include all of the nonionic, anionic and cationic dispersants that are customary in the formulation of active agrochemical ingredients. Use may be made preferably of nonionic or anionic dispersants or of mixtures of nonionic or anionic dispersants. Suitable nonionic dispersants are, in particular, ethylene oxide-propylene oxide block polymers, alkylphenol polyglycol ethers and also tristyrylphenol polyglycol ethers, and the phosphated or sulphated derivatives of these. Suitable anionic dispersants are, in particular, lignosulphonates, salts of polyacrylic acid, and arylsulphonate-formaldehyde condensates.

Antifoams which may be present in the seed-dressing formulations which can be used in accordance with the invention include all of the foam inhibitors that are customary in the formulation of active agrochemical ingredients. Use may be made preferably of silicone antifoams and magnesium stearate.

Preservatives which may be present in the seed-dressing formulations which can be used in accordance with the invention include all of the substances which can be employed for such purposes in agrochemical compositions. Examples include dichlorophen and benzyl alcohol hemiformal.

Secondary thickeners which may be present in the seed-dressing formulations which can be used in accordance with the invention include all substances which can be used for such purposes in agrochemical compositions. Those contemplated with preference include cellulose derivatives, acrylic acid derivatives, xanthan, modified clays and highly disperse silica.

Stickers which may be present in the seed-dressing formulations which can be used in accordance with the invention include all customary binders which can be used in seed-dressing products. Preferred mention may be made of polyvinylpyrrolidone, polyvinyl acetate, polyvinyl alcohol and tylose.

Gibberellins which may be present in the seed-dressing formulations which can be used in accordance with the invention include preferably the gibberellins A1, A3 (=gibberellic acid), A4 and A7, with gibberellic acid being used with particular preference. The gibberellins are known (cf. R. Wegler, "Chemie der Pflanzenschutz-und Schädlingsbekämpfungsmittel", Volume 2, Springer Verlag, 1970, pp. 401-412).

The seed-dressing formulations which can be used in accordance with the invention may be used, either directly or after prior dilution with water, to treat seed of any of a wide variety of types. Accordingly, the concentrates or the preparations obtainable from them by dilution with water may be employed to dress the seed of cereals, such as wheat, barley, rye, oats and triticale, and also the seed of maize, rice, oilseed rape, peas, beans, cotton, sunflowers and beets, or else the seed of any of a very wide variety of vegetables. The seed-dressing formulations which can be used in accordance with the invention, or their diluted preparations, may also be used to dress seed of transgenic plants. In that case, additional synergistic effects may occur in interaction with the substances formed through expression.

For the treatment of seed with the seed-dressing formulations which can be used in accordance with the invention, or with the preparations produced from them by addition of water, suitable mixing equipment includes all such equipment which can typically be employed for seed dressing. More particularly, the procedure when carrying out seed dressing is to place the seed in a mixer, to add the particular desired amount of seed-dressing formulations, either as such or following dilution with water beforehand, and to carry out mixing until the distribution of the formulation on the seed is uniform. This may be followed by a drying operation.

The application rate of the seed-dressing formulations which can be used in accordance with the invention may be varied within a relatively wide range. Typically, the bacterium active against at least one plant pathogen when applied to a seed is applied at a rate of about $1 \times 10^2$ to about $1 \times 10^7$ cfu/seed, depending on the size of the seed. In some embodiments, the application rate is about $1 \times 10^3$ to about $1 \times 10^6$ cfu per seed.

Also disclosed is the use of the composition according to the invention as fungicide and/or bactericide.

Non-limiting examples of pathogens of fungal diseases include:

diseases caused by powdery mildew pathogens, for example members of the Erysiphales. Known species causing powedery mildew include *Blumeria* species, for example *Blumeria graminis*; *Podosphaera* species, for example *Podosphaera leucotricha*; *Sphaerotheca* species, for example *Sphaerotheca fuliginea*; *Uncinula* species, for example *Uncinula necator*;

diseases caused by rust disease pathogens, for example *Gymnosporangium* species, for example *Gymnosporangium sabinae*; *Hemileia* species, for example *Hemileia vastatrix*; *Phakopsora* species, for example *Phakopsora pachyrhizi* and *Phakopsora meibomiae*; *Puccinia* species, for example *Puccinia recondite, P. triticina, P. graminis* or *P. striiformis* or *P. hordei*; *Uromyces* species, for example *Uromyces appendiculatus*;

diseases caused by pathogens from the group of the Oomycetes, for example Albugo species, for example *Algubo candida*; *Bremia* species, for example *Bremia lactucae*; *Peronospora* species, for example *Peronospora pisi, P. parasitica* or *P. brassicae*; *Phytophthora* species, for example *Phytophthora infestans*; *Plasmopara* species, for example *Plasmopara viticola*; *Pseudoperonospora* species, for example *Pseudoperonospora humuli* or *Pseudoperonospora cubensis*; *Pythium* species, for example *Pythium ultimum*;

leaf blotch diseases and leaf wilt diseases caused, for example, by *Alternaria* species, for example *Alternaria solani*; *Cercospora* species, for example *Cercospora beticola*; *Cladiosporium* species, for example *Cladosporium cucumerinum*; *Cochliobolus* species, for example *Cochliobolus sativus* (conidia form: *Drechslera*, Syn: *Helminthosporium*), *Cochliobolus miyabeanus*; *Colletotrichum* species, for example *Colletotrichum lindemuthanium*; *Cycloconium* species, for example *Cycloconium oleaginum*; *Diaporthe* species, for example *Diaporthe citri*; *Elsinoe* species, for example *Elsinoe fawcettii*; *Gloeosporium* species, for example *Gloeosporium laeticolor*; *Glomerella* species, for example *Glomerella cingulata*; *Guignardia* species, for example *Guignardia bidwellii*; *Leptosphaeria* species, for example *Leptosphaeria maculans, Leptosphaeria nodorum*; *Magnaporthe* species, for example *Magnaporthe grisea*; *Microdochium* species, for example *Microdochium nivale*; *Mycosphaerella* species, for example *Mycosphaerella graminicola, M. arachidicola* and *M. fijiensis*; *Phaeosphaeria* species, for example Phaeosphaeria *nodorum*; *Pyrenophora* species, for example *Pyrenophora teres, Pyrenophora tritici repentis*; *Ramularia* species, for example *Ramularia collo-cygni, Ramularia areola*; *Rhynchosporium* species, for example *Rhynchosporium secalis*; *Septoria* species, for example *Septoria apii, Septoria lycopersii*; *Typhula* species, for example *Typhula incarnata*; *Venturia* species, for example *Venturia inaequalis*;

root and stem diseases caused, for example, by *Corticium* species, for example *Corticium graminearum*; *Fusarium* species, for example *Fusarium oxysporum*; *Gaeumannomyces* species, for example *Gaeumannomyces graminis*; *Rhizoctonia* species, such as, for example *Rhizoctonia solani*; *Sarocladium* diseases caused for example by *Sarocladium oryzae*; *Sclerotium* diseases caused for example by *Sclerotium oryzae*; *Tapesia* species, for example *Tapesia acuformis*; *Thielaviopsis* species, for example *Thielaviopsis basicola*;

ear and panicle diseases (including corn cobs) caused, for example, by *Alternaria* species, for example *Alternaria* spp.; *Aspergillus* species, for example *Aspergillus flavus*; *Cladosporium* species, for example *Cladosporium cladosporioides*; *Claviceps* species, for example *Claviceps purpurea*; *Fusarium* species, for example *Fusarium culmorum*; *Gibberella* species, for example *Gibberella zeae*; *Monographella* species, for example *Monographella nivalis*; *Septoria* species, for example *Septoria nodorum*;

diseases caused by smut fungi, for example *Sphacelotheca* species, for example *Sphacelotheca reiliana*; *Tilletia* species, for example *Tilletia caries, T. controversa*; *Urocystis* species, for example *Urocystis occulta*; *Ustilago* species, for example *Ustilago nuda, U. nuda tritici*;

fruit rot caused, for example, by *Aspergillus* species, for example *Aspergillus flavus*; *Botrytis* species, for example *Botrytis cinerea*; *Penicillium* species, for example *Penicillium expansum* and *P. purpurogenum*; *Sclerotinia* species, for example *Sclerotinia sclerotiorum*; *Verticillium* species, for example *Verticillium alboatrum*;

seed and soilborne decay, mould, wilt, rot and damping-off diseases caused, for example, by *Alternaria* species, caused for example by *Alternaria brassicicola*; *Aphanomyces* species, caused for example by *Aphanomyces euteiches*; *Ascochyta* species, caused for example by *Ascochyta lentis*; *Aspergillus* species, caused for example by *Aspergillus flavus*; *Cladosporium* species, caused for example by *Cladosporium herbarum*; *Cochliobolus* species, caused for example by *Cochliobolus sativus*; (Conidiaform: *Drechslera, Bipolaris* Syn: *Helminthosporium*); *Colletotrichum* species, caused for example by *Colletotrichum coccodes*; *Fusarium* species, caused for example by *Fusarium culmorum*; *Gibberella* species, caused for example by *Gibberella zeae*; *Macrophomina* species, caused for example by *Macrophomina phaseolina*; *Monographella* species, caused for example by *Monographella nivalis*; *Penicillium* species, caused for example by *Penicillium expansum*; *Phoma* species, caused for example by *Phoma lingam*; *Phomopsis* species, caused for example by *Phomopsis sojae*; *Phytophthora* species, caused for example by *Phytophthora cactorum*; *Pyrenophora* species, caused for example by *Pyrenophora graminea*; *Pyricularia* species, caused for example by *Pyricularia oryzae*; *Pythium* species, caused for example by *Pythium ultimum*; *Rhizoctonia* species, caused for example by *Rhizoctonia solani*; *Rhizopus* species, caused for example by *Rhizopus oryzae*; *Sclerotium* species, caused for example by *Sclerotium rolfsii*; *Septoria* species, caused for example by *Septoria nodorum*; *Typhula* species, caused for example by *Typhula incarnata*; *Verticillium* species, caused for example by *Verticillium dahliae*;

cancers, galls and witches' broom caused, for example, by *Nectria* species, for example *Nectria galligena*;

wilt diseases caused, for example, by *Monilinia* species, for example *Monilinia laxa*; leaf blister or leaf curl diseases caused, for example, by *Exobasidium* species, for example *Exobasidium vexans*;

*Taphrina* species, for example *Taphrina deformans*;

decline diseases of wooden plants caused, for example, by Esca disease, caused for example by *Phaemoniella clamydospora*, *Phaeoacremonium aleophilum* and *Fomitiporia mediterrane*; *Eutypa dyeback*, caused for example by *Eutypa lata*; *Ganoderma* diseases caused for example by *Ganoderma boninense*; *Rigidoporus* diseases caused for example by *Rigidoporus lignosus*;

diseases of flowers and seeds caused, for example, by *Botrytis* species, for example *Botrytis cinerea*;

diseases of plant tubers caused, for example, by *Rhizoctonia* species, for example *Rhizoctonia solani*; *Helminthosporium* species, for example *Helminthosporium solani*;

Club root caused, for example, by *Plasmodiophora* species, for example *Plamodiophora brassicae*;

diseases caused by bacterial pathogens, for example *Xanthomonas* species, for example *Xanthomonas campestris* pv. *oryzae*; *Pseudomonas* species, for example *Pseudomonas syringae* pv. *lachrymans*; *Erwinia* species, for example *Erwinia amylovora*.

The following diseases of soya beans could be controlled:

Fungal diseases on leaves, stems, pods and seeds caused, for example, by *Alternaria* leaf spot (*Alternaria* spec. *atrans tenuissima*), Anthracnose (*Colletotrichum gloeosporoides dematium* var. *truncatum*), brown spot (*Septoria glycines*), cercospora leaf spot and blight (*Cercospora kikuchii*), choanephora leaf blight (*Choanephora infiindibulifera trispora* (Syn.)), dactuliophora leaf spot (*Dactuliophora glycines*), downy mildew (*Peronospora manshurica*), drechslera blight (*Drechslera glycini*), frogeye leaf spot (*Cercospora sojina*), leptosphaerulina leaf spot (*Leptosphaerulina trifolii*), phyllostica leaf spot (*Phyllosticta sojaecola*), pod and stem blight (*Phomopsis sojae*), powdery mildew (*Microsphaera diffusa*), pyrenochaeta leaf spot (*Pyrenochaeta glycines*), rhizoctonia aerial, foliage, and web blight (*Rhizoctonia solani*), rust (*Phakopsora pachyrhizi*, *Phakopsora meibomiae*), scab (*Sphaceloma glycines*), stemphylium leaf blight (*Stemphylium botryosum*), target spot (*Corynespora cassiicola*).

Fungal diseases on roots and the stem base caused, for example, by black root rot (*Calonectria crotalariae*), charcoal rot (*Macrophomina phaseolina*), fusarium blight or wilt, root rot, and pod and collar rot (*Fusarium oxysporum*, *Fusarium orthoceras*, *Fusarium semitectum*, *Fusarium equiseti*), mycoleptodiscus root rot (*Mycoleptodiscus terrestris*), neocosmospora (*Neocosmospora vasinfecta*), pod and stem blight (*Diaporthe phaseolorum*), stem canker (*Diaporthe phaseolorum* var. *caulivora*), phytophthora rot (*Phytophthora megasperma*), brown stem rot (*Phialophora gregata*), pythium rot (*Pythium aphanidermatum*, *Pythium irregulare*, *Pythium debaryanum*, *Pythium myriotylum*, *Pythium ultimum*), rhizoctonia root rot, stem decay, and damping-off (*Rhizoctonia solani*), sclerotinia stem decay (*Sclerotinia sclerotiorum*), sclerotinia southern blight (*Sclerotinia rolfsii*), thielaviopsis root rot (*Thielaviopsis basicola*).

In addition, the compound and the composition of the invention may reduce the mycotoxin content in the harvested material and the foods and feeds prepared therefrom. Mycotoxins include particularly, but not exclusively, the following: deoxynivalenol (DON), nivalenol, 15-Ac-DON, 3-Ac-DON, T2- and HT2-toxin, fumonisins, zearalenon, moniliformin, fusarin, diaceotoxyscirpenol (DAS), beauvericin, enniatin, fusaroproliferin, fusarenol, ochratoxins, patulin, ergot alkaloids and aflatoxins which can be produced, for example, by the following fungi: *Fusarium* spec., such as *F. acuminatum*, *F. asiaticum*, *F. avenaceum*, *F. crookwellense*, *F. culmorum*, *F. graminearum* (*Gibberella zeae*), *F. equiseti*, *F. fujikoroi*, *F. musarum*, *F. oxysporum*, *F. proliferatum*, *F. poae*, *F. pseudograminearum*, *F. sambucinum*, *F. scirpi*, *F. semitectum*, *F. solani*, *F. sporotrichoides*, *F. langsethiae*, *F. subglutinans*, *F. tricinctum*, *F. verticillioides* etc., and also by *Aspergillus* spec., such as *A. flavus*, *A. parasiticus*, *A. nomius*, *A. ochraceus*, *A. clavatus*, *A. terreus*, *A. versicolor*, *Penicillium* spec., such as *P. verrucosum*, *P. viridicatum*, *P. citrinum*, *P. expansum*, *P. claviforme*, *P. roqueforti*, *Claviceps* spec., such as *C. purpurea*, *C. fusiformis*, *C. paspali*, *C. africana*, *Stachybotrys* spec. and others.

Preferred fungal plant pathogens to be treated according to the invention comprise species of genus *Botrytis*, *Alternaria*, *Rhizoctonia*, *Sclerotinia*, *Fusarium*, *Pythium*, *Uncinula*, *Leveillula*, *Sclerotium*, *Thielaviopsis*, *Verticillium*, *Magnaporthe*, *Ustilago*, *Phakospora*, *Puccinia*, *Colletotrichum*, *Phytophthora* and *Armillaria* and powdery mildew. Often the plant pathogen is one or more species of genus *Botrytis*, *Alternaria*, *Rhizoctonia*, *Sclerotinia*, *Fusarium*, *Pythium*, *Uncinula*, *Leveillula*, *Phytophthora* and *Sclerotium*. For instance, the fungus may be selected from *Botrytis cinerea*, *Rhizoctonia solani*, *Uncinula necator*, *Leveillula taurica*, *Pythium ultimum*, *Sclerotium rolfsii*, *Magnaporthe oryzae*, *Fusarium graminearum*, *Blumeria graminis*, *Mycosphaerella graminicola*, *Ustilago maydis*, *Melampsora lini*, *Phytophthora infestans*, *Fusarium oxysporum* and *Fusarium oxysporum lycopersici*.

More preferably, the plant pathogen is a strain of a genus selected from the group consisting of *Venturia*, *Sclerotinia*, *Rhizoctonia*, *Phytium*, *Alternaria*, *Botrytis*, *Phytophthora*, *Puccinia*, *Blumeria*, *Fusarium* and *Septoria*.

Non-limiting examples of bacterial phytopathogens include those of the families Pseudomonadaceae, Rhizobiaceae, Xanthomonadaceae, Enterobacteriaceae, Corynebacteriaceae and Streptomycetaceae, more particularly *Xanthomonas* species, for example *Xanthomonas campestris* pv. *oryzae*; *Pseudomonas* species, for example *Pseudomonas syringae* pv. *lachrymans*; *Erwinia* species, for example *Erwinia amylovora*; *Liberibacter* species, for example *Liberibacter asiaticus*; *Xyella* species, for example *Xylella fastidiosa*; *Ralstonia* species, for example *Ralstonia solanacearum*; *Dickeya* species, for example *Dickeya solani*; *Clavibacter* species, for example *Clavibacter michiganensis*; *Streptomyces* species, for example *Streptomyces scabies*.

Specific examples of bacterial plant pathogens also include

*Acidovorax avenae* (=*Pseudomonas avenae*, *Pseudomonas avenae* subsp. *avenae*, *Pseudomonas rubrilineans*), including e.g. *Acidovorax avenae* subsp. *avenae* (=*Pseudomonas avenae* subsp. *avenae*), *Acidovorax avenae* subsp. *cattleyae* (=*Pseudomonas cattleyae*),

*Acidovorax avenae* subsp. *citrulli* (=*Pseudomonas pseudoalcaligenes* subsp. *citrulli*, *Pseudomonas avenae* subsp. *citrulli*));

*Burkholderia* spec., including e.g. *Burkholderia andropogonis* (=*Pseudomonas andropogonis*, *Pseudomonas woodsii*), *Burkholderia caryophylli* (=*Pseudomonas caryophylli*), *Burkholderia cepacia* (=*Pseudomonas cepacia*), *Burkholderia gladioli* (=*Pseudomonas gladioli*), *Burkholderia gladioli* pv. *agaricicola* (=Pseudomnas *gladioli* pv. *agaricicola*), *Burkholderia gladioli* pv. *alliicola* (=*Pseudomonas gladioli* pv. *alliicola*), *Burkholderia gladioli* pv. *gladioli* (=*Pseudomonas gladioli*, *Pseudomonas gladioli* pv. *gladioli*), *Burkholderia glumae* (=*Pseudomonas glumae*), *Burkholderia plantarii* (=*Pseudomonas plantarii*) *Burkholderia solanacearum* (=*Ralstonia solanacearum*), and *Ralstonia* spp.;

*Liberibacter* spp., including *Candidatus liberibacter* spec., including e.g. *Liberibacter africanus* (Laf), *Liberibacter americanus* (Lam), *Liberibacter asiaticus* (Las), *Liberibacter europaeus* (Leu), *Liberibacter psyllaurous*, *Liberibacter solanacearum* (Lso);

*Corynebacterium*, including e.g. *Corynebacterium fascians*, *Corynebacterium flaccumfaciens* pv. *flaccumfaciens*, *Corynebacterium michiganensis*, *Corynebacterium michiganense* pv. *tritici*, *Corynebacterium michiganense* pv. *nebraskense*, *Corynebacterium sepedonicum*;

*Erwinia* spec. including e.g. *Erwinia amylovora*, *Erwinia ananas*, *Erwinia carotovora* (=*Pectobacterium carotovorum*), *Erwinia carotovora* subsp. *atroseptica*, *Erwinia carotovora* subsp. *carotovora*, *Erwinia chrysanthemi*, *Erwinia chrysanthemi* pv. *zeae*, *Erwinia dissolvens*, *Erwinia herbicola*, *Erwinia rhapontic*, *Erwinia stewartiii*, *Erwinia tracheiphila*, *Erwinia uredovora*;

*Pseudomonas syringae*, including e.g. *Pseudomonas syringae* pv. *actinidiae* (Psa), *Pseudomonas syringae* pv. *atrofaciens*, *Pseudomonas syringae* pv. *coronafaciens*, *Pseudomonas syringae* pv. *glycinea*, *Pseudomonas syringae* pv. *lachrymans*, *Pseudomonas syringae* pv. *maculicola* *Pseudomonas syringae* pv. *papulans*, *Pseudomonas syringae* pv. *striafaciens*, *Pseudomonas syringae* pv. *syringae*, *Pseudomonas syringae* pv. *tomato*, *Pseudomonas syringae* pv. *tabaci*;

*Streptomyces* ssp., including e.g. *Streptomyces acidiscabies*, *Streptomyces albidoflavus*, *Streptomyces candidus* (=*Actinomyces candidus*), *Streptomyces caviscabies*, *Streptomyces collinus*, *Streptomyces europaeiscabiei*, *Streptomyces intermedius*, *Streptomyces ipomoeae*, *Streptomyces luridiscabiei*, *Streptomyces niveiscabiei*, *Streptomyces puniciscabiei*, *Streptomyces retuculiscabiei*, *Streptomyces scabiei*, *Streptomyces scabies*, *Streptomyces setonii*, *Streptomyces steliiscabiei*, *Streptomyces turgidiscabies*, *Streptomyces wedmorensis*;

*Xanthomonas axonopodis*, including e.g. *Xanthomonas axonopodis* pv. *alfalfae* (=*Xanthomonas alfalfae*), *Xanthomonas axonopodis* pv. *aurantifolii* (=*Xanthomonas fuscans* subsp. *aurantifolii*), *Xanthomonas axonopodis* pv. *allii* (=*Xanthomonas campestris* pv. *allii*), *Xanthomonas axonopodis* pv. *axonopodis*, *Xanthomonas axonopodis* pv. *bauhiniae* (=*Xanthomonas campestris* pv. *bauhiniae*), *Xanthomonas axonopodis* pv. *begoniae* (=*Xanthomonas campestris* pv. *begoniae*), *Xanthomonas axonopodis* pv. *betlicola* (=*Xanthomonas campestris* pv. *betlicola*), *Xanthomonas axonopodis* pv. *biophyti* (=*Xanthomonas campestris* pv. *biophyti*), *Xanthomonas axonopodis* pv. *cajani* (=*Xanthomonas campestris* pv. *cajani*), *Xanthomonas axonopodis* pv. *cassavae* (=*Xanthomonas cassavae*, *Xanthomonas campestris* pv. *cassavae*), *Xanthomonas axonopodis* pv. *cassiae* (=*Xanthomonas campestris* pv. *cassiae*), *Xanthomonas axonopodis* pv. *citri* (=*Xanthomonas citri*), *Xanthomonas axonopodis* pv. *citrumelo* (=*Xanthomonas alfalfae* subsp. *citrumelonis*), *Xanthomonas axonopodis* pv. *clitoriae* (=*Xanthomonas campestris* pv. *clitoriae*), *Xanthomonas axonopodis* pv. *coracanae* (=*Xanthomonas campestris* pv. *coracanae*), *Xanthomonas axonopodis* pv. *cyamopsidis* (=*Xanthomonas campestris* pv. *cyamopsidis*), *Xanthomonas axonopodis* pv. *desmodii* (=*Xanthomonas campestris* pv. *desmodii*), *Xanthomonas axonopodis* pv. *desmodiigangetici* (=*Xanthomonas campestris* pv. *desmodiigangetici*), *Xanthomonas axonopodis* pv. *desmodiilaxiflori* (=*Xanthomonas campestris* pv. *desmodiilaxiflori*), *Xanthomonas axonopodis* pv. *desmodiirotundifolii* (=*Xanthomonas campestris* pv. *desmodiirotundifolii*), *Xanthomonas axonopodis* pv. *dieffenbachiae* (=*Xanthomonas campestris* pv. *dieffenbachiae*), *Xanthomonas axonopodis* pv. *erythrinae* (=*Xanthomonas campestris* pv. *erythrinae*), *Xanthomonas axonopodis* pv. *fascicularis* (=*Xanthomonas campestris* pv. *fasciculari*), *Xanthomonas axonopodis* pv. *glycines* (=*Xanthomonas campestris* pv. *glycines*), *Xanthomonas axonopodis* pv. *khayae* (=*Xanthomonas campestris* pv. *khayae*), *Xanthomonas axonopodis* pv. *lespedezae* (=*Xanthomonas campestris* pv. *lespedezae*), *Xanthomonas axonopodis* pv. *maculifoliigardeniae* (=*Xanthomonas campestris* pv. *maculifoliigardeniae*), *Xanthomonas axonopodis* pv. *malvacearum* (=*Xanthomonas citri* subsp. *malvacearum*), *Xanthomonas axonopodis* pv. *manihotis* (=*Xanthomonas campestris* pv. *manihotis*), *Xanthomonas axonopodis* pv. *martyniicola* (=*Xanthomonas campestris* pv. *martyniicola*), *Xanthomonas axonopodis* pv. *melhusii* (=*Xanthomonas campestris* pv. *melhusii*), *Xanthomonas axonopodis* pv. *nakataecorchori* (=*Xanthomonas campestris* pv. *nakataecorchori*), *Xanthomonas axonopodis* pv. *passiflorae* (=*Xanthomonas campestris* pv. *passiflorae*), *Xanthomonas axonopodis* pv. *patelii* (=*Xanthomonas campestris* pv. *patelii*), *Xanthomonas axonopodis* pv. *pedalii* (=*Xanthomonas campestris* pv. *pedalii*), *Xanthomonas axonopodis* pv. *phaseoli* (=*Xanthomonas campestris* pv. *phaseoli*, *Xanthomonas phaseoli*), *Xanthomonas axonopodis* pv. *phaseoli* var. *fuscans* (=*Xanthomonas fuscans*), *Xanthomonas axonopodis* pv. *phyllanthi* (=*Xanthomonas campestris* pv. *phyllanthi*), *Xanthomonas axonopodis* pv. *physalidicola* (=*Xanthomonas campestris* pv. *physalidicola*), *Xanthomonas axonopodis* pv. *poinsettiicola* (=*Xanthomonas campestris* pv. *poinsettiicola*), *Xanthomonas axonopodis* pv. *punicae* (=*Xanthomonas campestris* pv. *punicae*), *Xanthomonas axonopodis* pv. *rhynchosiae* (=*Xanthomonas campestris* pv. *rhynchosiae*), *Xanthomonas axonopodis* pv. *ricini* (=*Xanthomonas campestris* pv. *ricini*), *Xanthomonas axonopodis* pv. *sesbaniae* (=*Xanthomonas campestris* pv. *sesbaniae*), *Xanthomonas axonopodis* pv. *tamarindi* (=*Xanthomonas campestris* pv. *tamarindi*), *Xanthomonas axonopodis* pv. *vasculorum* (=*Xanthomonas campestris* pv. *vasculorum*), *Xanthomonas axonopodis* pv. *vesicatoria* (=*Xanthomonas campestris* pv. *vesicatoria*, *Xanthomonas vesicatoria*), *Xanthomonas axonopodis* pv. *vignaeradiatae* (=*Xanthomonas campestris* pv. *vig-* naeradiatae), *Xanthomonas axonopodis* pv. *vignicola* (=*Xanthomonas campestris* pv. *vignicola*), *Xanthomonas axonopodis* pv. *vitians* (=*Xanthomonas campestris* pv. *vitians*);
*Xanthomonas campestris* pv. *musacearum*, *Xanthomonas campestris* pv. *pruni* (=*Xanthomonas arboricola* pv. *pruni*), *Xanthomonas fragariae;*
*Xanthomonas translucens* (=*Xanthomonas campestris* pv. *hordei*) including e.g. *Xanthomonas translucens* pv. *arrhenatheri* (=*Xanthomonas campestris* pv. *arrhenatheri*), *Xanthomonas translucens* pv. *cerealis* (=*Xanthomonas campestris* pv. *cerealis*), *Xanthomonas translucens* pv. *graminis* (=*Xanthomonas campestris* pv. *graminis*), *Xanthomonas translucens* pv. *phlei* (=*Xanthomonas campestris* pv. *phlei*), *Xanthomonas translucens* pv. *phleipratensis* (=*Xanthomonas campestris* pv. *phleipratensis*), *Xanthomonas translucens* pv. *poae* (=*Xanthomonas campestris* pv. *poae*), *Xanthomonas translucens* pv. *secalis* (=*Xanthomonas campestris* pv. *secalis*), *Xanthomonas translucens* pv. *translucens* (=*Xanthomonas campestris* pv. *translucens*), *Xanthomonas translucens* pv. *undulosa* (=*Xanthomonas campestris* pv. *undulosa*).
*Xanthomonas oryzae*, *Xanthomonas oryzae* pv. *oryzae* (=*Xanthomonas campestris* pv. *oryzae*), *Xanthomonas oryzae* pv. *oryzicola* (=*Xanthomonas campestris* pv. *oryzicola*).
*Xylella fastidiosa* from the family of Xanthomonadaceae.

The composition according to the present invention can be used for curative or protective/preventive control of phytopathogenic fungi and/or bacteria. The invention therefore also relates to curative and protective methods for controlling phytopathogenic fungi and/or bacteria by the use of the inventive composition, which is applied to the seed, the plant or plant parts, the fruit or the soil in which the plants grow.

The fact that the composition is well tolerated by plants at the rates required for controlling plant diseases allows the treatment of above-ground parts of plants, of propagation stock and seeds, and of the soil.

The use according to the invention is thus preferably for reducing overall damage of plants and plant parts as well as losses in harvested fruits or vegetables caused by phytopathogens.

The composition according to the invention may preferably be used for treating conventional or transgenic plants or seed thereof.

The present invention also relates to a method for enhancing the action of a biological control agent against plant pathogens, such as the fungicidal and/or bactericidal actin, comprising mixing a biological control agent as defined herein with one or more fatty acids or derivatives thereof as defined herein and applying said mixture to a plant or seed or a locus where said plant or seed is intended to be grown.

According to the invention all plants and plant parts can be treated. By plants is meant all plants and plant populations such as desirable and undesirable wild plants, cultivars and plant varieties (whether or not protectable by plant variety or plant breeder's rights). Cultivars and plant varieties can be plants obtained by conventional propagation and breeding methods which can be assisted or supplemented by one or more biotechnological methods such as by use of double haploids, protoplast fusion, random and directed mutagenesis, molecular or genetic markers or by bioengineering and genetic engineering methods. By plant parts is meant all above ground and below ground parts and organs of plants such as shoot, leaf, blossom and root, whereby for example leaves, needles, stems, branches, blossoms, fruiting bodies, fruits and seed as well as roots, corms and rhizomes are listed. Crops and vegetative and generative propagating material, for example cuttings, corms, rhizomes, runners and seeds also belong to plant parts.

The inventive composition, when it is well tolerated by plants, has favourable homeotherm toxicity and is well tolerated by the environment, is suitable for protecting plants and plant organs, for enhancing harvest yields, for improving the quality of the harvested material. It can preferably be used as crop protection composition. It is active against normally sensitive and resistant species and against all or some stages of development.

Plants which can be treated in accordance with the invention include the following main crop plants: maize, soya bean, alfalfa, cotton, sunflower, *Brassica* oil seeds such as *Brassica napus* (e.g., canola, rapeseed), *Brassica rapa*, *B. juncea* (e.g., (field) mustard) and *Brassica carinata*, *Arecaceae* sp. (e.g., oilpalm, coconut), rice, wheat, sugar beet, sugar cane, oats, rye, barley, millet and sorghum, triticale, flax, nuts, grapes and vine and various fruit and vegetables from various botanic taxa, e.g. *Rosaceae* sp. (e.g., pome fruits such as apples and pears, but also stone fruits such as apricots, cherries, almonds, plums and peaches, and berry fruits such as strawberries, raspberries, red and black currant and gooseberry), *Ribesioidae* sp., *Juglandaceae* sp., *Betulaceae* sp., *Anacardiaceae* sp., *Fagaceae* sp., *Moraceae* sp., *Oleaceae* sp. (e.g., olive tree), *Actinidaceae* sp., *Lauraceae* sp. (e.g., avocado, cinnamon, camphor), *Musaceae* sp. (e.g., banana trees and plantations), *Rubiaceae* sp. (e.g., coffee), *Theaceae* sp. (e.g., tea), *Sterculiceae* sp., *Rutaceae* sp. (e.g., lemons, oranges, mandarins and grapefruit); *Solanaceae* sp. (e.g., tomatoes, potatoes, peppers, capsicum, aubergines, tobacco), *Liliaceae* sp., *Compositae* sp. (e.g., lettuce, artichokes and chicory—including root chicory, endive or common chicory), *Umbelliferae* sp. (e.g., carrots, parsley, celery and celeriac), *Cucurbitaceae* sp. (e.g., cucumbers—including gherkins, pumpkins, watermelons, calabashes and melons), *Alliaceae* sp. (e.g., leeks and onions), *Cruciferae* sp. (e.g., white cabbage, red cabbage, broccoli, cauliflower, Brussels sprouts, pak choi, kohlrabi, radishes, horseradish, cress and chinese cabbage), *Leguminosas* sp. (e.g., peanuts, peas, lentils and beans—e.g., common beans and broad beans), *Chenopodiaceae* sp. (e.g., Swiss chard, fodder beet, spinach, bectroot), *Linnaea* sp. (e.g., hemp), *Cannabaceae* sp. (e.g., cannabis), *Malvaceae* sp. (e.g., okra, cocoa), Papaveraceae (e.g., poppy), Asparagaceae (e.g., asparagus); useful plants and ornamental plants in the garden and woods including turf, lawn, grass and *Stevia rebaudiana*; and in each case genetically modified types of these plants.

Plants that may be treated according to the invention include hybrid plants that already express the characteristic of heterosis or hybrid vigor which results in generally higher yield, vigor, health and resistance towards biotic and abiotic stress factors. Such plants are typically made by crossing an inbred male-sterile parent line (the female parent) with another inbred male-fertile parent line (the male parent). Hybrid seed is typically harvested from the male sterile plants and sold to growers. Male sterile plants can sometimes (e.g., in corn) be produced by detasseling, i.e., the mechanical removal of the male reproductive organs (or males flowers) but, more typically, male sterility is the result of genetic determinants in the plant genome. In that case, and especially when seed is the desired product to be harvested from the hybrid plants it is typically useful to ensure that male fertility in the hybrid plants is fully restored. This can be accomplished by ensuring that the male parents have appropriate fertility restorer genes which are capable of restoring the male fertility in hybrid plants that contain the genetic determinants responsible for male-sterility. Genetic determinants for male sterility may be located in the cytoplasm. Examples of cytoplasmic male sterility (CMS) were for instance described in *Brassica* species. However, genetic determinants for male sterility can also be located in the nuclear genome. Male sterile plants can also be obtained by plant biotechnology methods such as genetic engineering. A particularly useful means of obtaining male-sterile plants is described in WO 89/10396 in which, for example, a ribonuclease such as barnase is selectively expressed in the tapetum cells in the stamens. Fertility can then be restored by expression in the tapetum cells of a ribonuclease inhibitor such as barstar.

Use of one or more fatty acids or derivatives thereof as defined herein above for enhancing the action of a biological control agent as defined herein above against at least one plant pathogen.

The invention also provides use of (i) one or more fatty acids or derivatives thereof as defined herein to improve the effect of (ii) a strain, culture, culture filtrate or spores of at least one bacterium active against at least one plant pathogen as defined herein in promoting growth in a plant.

The invention also provides use of (i) one or more fatty acids or derivatives thereof as defined herein to improve the effect of (ii) a strain, culture, culture filtrate or spores of at least one bacterium active against at least one plant pathogen as defined herein in controlling fungi, oomycetes and/or bacteria at a locus.

The invention also provides use of (ii) a strain, culture, culture filtrate or spores of at least one bacterium active against at least one plant pathogen as defined herein to improve the effect of (i) one or more fatty acids or derivatives thereof as defined herein in controlling fungi, oomycetes and/or bacteria at a locus.

The invention also provides use of (ii) a strain, culture, culture filtrate or spores of at least one bacterium active against at least one plant pathogen as defined herein to improve the effect of (i) one or more fatty acids or derivatives thereof as defined herein in protecting a plant against fungi, oomycetes and/or bacteria.

The invention also provides use of (ii) a strain, culture, culture filtrate or spores of at least one bacterium active against at least one plant pathogen as defined herein to improve the effect of (i) one or more fatty acids or derivatives thereof as defined herein in promoting growth in a plant.

The invention also provides use of (ii) a strain, culture, culture filtrate or spores of at least one bacterium active against at least one plant pathogen as defined herein to improve the effect of (i) one or more fatty acids or derivatives thereof as defined herein in controlling fungi, oomycetes and/or bacteria at a locus.

The invention also provides use of (ii) a strain, culture, culture filtrate or spores of at least one bacterium active against at least one plant pathogen as defined herein to improve the effect of (i) one or more fatty acids or derivatives thereof as defined herein in protecting a plant against fungi, oomycetes and/or bacteria.

The invention also provides use of (ii) a strain, culture, culture filtrate or spores of at least one bacterium active against at least one plant pathogen as defined herein to improve the effect of (i) one or more fatty acids or derivatives thereof as defined herein in promoting growth in a plant.

The invention also relates to a method for reducing overall damage of plants and plant parts as well as losses in harvested fruits or vegetables caused by phytopathogens comprising the step of simultaneously or sequentially applying at least one biological control agent as defined herein and one or more fatty acids or derivatives thereof as defined herein to a plant or seed or a locus where said plant or seed is intended to be grown. It is preferred that application is foliar.

The amount of bacteria active against at least one plant pathogen according to a), which is used or employed in combination with at least one fatty acid or derivative thereof according to b) described herein, optionally in the presence of at least one fungicide, bactericide and/or at least one insecticide, depends on the final formulation as well as size or type of the plant, plant parts, seeds, harvested fruits and vegetables to be treated. Usually, the bacteria active against at least one plant pathogen to be employed or used according to the invention is present in about 1% to about 80% (w/w), preferably in about 1% to about 60% (w/w), more preferably about 10% to about 50% (w/w) of its solo-formulation or combined-formulation with the at least one fatty acid or derivative thereof described herein, and optionally the fungicide, bactericide and/or the at least one insecticide.

Also the amount of the at least one fatty acid or derivative thereof described herein which is used or employed in combination with the bacteria active against at least one plant pathogen according to a), optionally in the presence of at least one further fungicide, bactericide and/or insecticide, depends on the final formulation as well as size or type of the plant, plant parts, seeds, harvested fruit or vegetable to be treated. Usually, the at least one fatty acid or derivative thereof according to a) described herein to be employed or used according to the invention is present in about 0.1% to about 10% (w/w), preferably 0.5% to about 5% (w/w), more preferably about 1% to about 4% (w/w) and any value in between, such as 1%, 1.5%, 2%, 2.5%, 3%, 3.5% or 4%, of its solo-formulation or 0.1% to about 5% (w/w), preferably 0.2% to about 2% (w/w) and any value in between, such as 0.25%, 0.5% 0.75%, of its combined-formulation with the bacteria active against at least one plant pathogen, and optionally the at least one fungicide and/or the at least one insecticide.

Application of the bacteria active against at least one plant pathogen, preferably the *Bacillus subtilis* and/or *Paenibacillus* based bacteria, or the composition according to the invention may be effected as a foliar spray, as a soil treatment, and/or as a seed treatment/dressing. When used as a soil treatment, the composition comprising said bacteria active against at least one plant pathogen can be applied as a soil surface drench, shanked-in, injected and/or applied in-furrow or by combination with irrigation water. The rate of application for drench soil treatments, which may be applied at planting, during or after seeding, or after transplanting and at any stage of plant growth, is typically about $1 \times 10^4$ to about $1 \times 10^{14}$ colony forming units (CFU) per hectare, at about $1 \times 10^4$ to about $1 \times 10^{12}$ colony forming units (CFU) per hectare, at about $1 \times 10^4$ to about $1 \times 10^{10}$ colony forming units (CFU) per hectare, at about $1 \times 10^4$ to about $1 \times 10^8$ colony forming units (CFU) per hectare, at about $1 \times 10^6$ to about $1 \times 10^{14}$ colony forming units (CFU) per hectare, at about $1 \times 10^6$ to about $1 \times 10^{12}$ colony forming units (CFU) per hectare, at about $1 \times 10^6$ to about $1 \times 10^{10}$ colony forming units (CFU) per hectare, at about $1 \times 10^6$ to about $1 \times 10^8$ colony forming units (CFU) per hectare, at about $1 \times 10^8$ to about $1 \times 10^{14}$ colony forming units (CFU) per hectare, at about $1 \times 10^8$ to about $1 \times 10^{12}$ colony forming units (CFU) per hectare, or at about $1\times10^8$ to about $1\times10^{10}$ colony forming units (CFU) per hectare. The rate of application for in-furrow treatments, applied at planting, is about $8\times10^9$ to about $1.5\times10^{11}$ cfu per 100 row meters. In some embodiments, the rate of application is about $2\times10^{10}$ to about $1.3\times10^{11}$ cfu per 100 row meters. In other embodiments, the rate of application is about $1\times10^{11}$ cfu per 100 row meters to about $1.5\times10^{11}$ cfu per 100 row meters. When used as a foliar treatment, in one embodiment, about $1\times10^8$ to about $5\times10^{13}$, about $1\times10^{10}$ to about $1.5\times10^{13}$, or about $1.2\times10^{12}$ to about $9.3\times10^{12}$ cfu/ha are applied.

It is preferred that the application of the composition is foliar.

The bacteria active against at least one plant pathogen and the at least one fatty acid or derivative thereof described herein, and if present preferably also the fungicide, bactericide and/or the insecticide may be used or employed in weight ratios providing for the effect of enhanced fungicidal and/or bactericidal activity. Preferably, the weight ratio is a synergistic weight ratio. The skilled person is able to find out the synergistic weight ratios for the present invention by routine methods. The skilled person understands that these ratios refer to the ratio within a combined-formulation as well as to the calculative ratio of the bacteria active against at least one plant pathogen described herein and the at least one fatty acid or derivative thereof described herein when both components are applied as mono-formulations to a plant to be treated. The skilled person can calculate this ratio by simple mathematics since the volume and the amount of the recombinant bacteria and the at least one fatty acid or derivative thereof described herein, respectively, in a mono-formulation is known to the skilled person.

The ratio can be calculated based on the amount of the at least one fatty acid or derivative thereof disclosed herein, at the time point of applying said component of a combination according to the invention to a plant or plant part and the amount of a bacterium active against at least one plant pathogen shortly prior (e.g., 48 h, 24 h, 12 h, 6 h, 2 h, 1 h) or at the time point of applying said component of a combination according to the invention to a plant or plant part.

The application of the bacterium active against at least one plant pathogen and the at least one fatty acid or derivative thereof disclosed herein to a plant or a plant part can take place simultaneously or at different times as long as both components are present on or in the plant after the application(s).

In particular, in one embodiment the weight ratio, preferably the synergistic weight ratio, of the bacterium active against at least one plant pathogen (i.e., the unformulated spore preparation or the respective fraction of pure spores contained in a formulation) and the at least one fatty acid or derivative thereof described herein lies in the range of 1:500 to 50:1; in the range of 1:250 to 10:1; in the range of 1:100 to 10:1. Additional ratios are between 1:50 and 1:1 or even between 1:25 and 1:5, such as 1:20, 1:18, 1:15 or 1:12. In a preferred embodiment, the (synergistic) weight ratio is between 1:0.5 and 1:4, such as 1:1, 1:2, 1:3 or 1:4. In embodiments in which the fungicidally and/or bactericidally active bacterium disclosed herein is *Bacillus*-based, the weight to weight ratio should be applied to the unformulated *Bacillus* spore preparation. In one aspect of this embodiment, the spore preparation of the fungicidally and/or bactericidally active bacterium disclosed herein is dried spore preparation containing at least about $1\times10^4$ cfu/g, at least about $1\times10^5$ cfu/g, at least about $1\times10^6$ cfu/g at least about $1\times10^7$ cfu/g, at least about $1\times10^8$ cfu/g, at least about $1\times10^9$ cfu/g, at least about $1\times10^{10}$ cfu/g, and at least about $1\times10^{11}$ cfu/g.

The application rate of composition to be employed or used according to the present invention may vary. The skilled person is able to find the appropriate application rate by way of routine experiments and based on the disclosure elsewhere in this application.

In another aspect, the present invention relates to a method for increasing crop yield and/or the quality of food commodities comprising the step of simultaneously or sequentially applying at least one biological control agent as defined herein above and one or more fatty acids or derivatives thereof as defined herein above to a plant or seed or a locus where said plant or seed is intended to be grown.

In a further aspect, the present invention relates to a kit-of-parts comprising a biological control agent which is a fungicidally and/or bactericidally active bacterium as defined in herein above and one or more fatty acids or derivatives thereof as defined herein above.

In a preferred embodiment of the present invention the above-mentioned kit of parts further comprises at least one additional fungicide, bactericide and/or at least one insecticide, with the proviso that the fungicidally and/or bactericidally active bacterium, the insecticide, bactericide and the fungicide are not identical. The fungicide, bactericide and/or the insecticide can be present in the component of the kit of parts comprising the particular biological control agent or in the component comprising the at least one fatty acid or derivative thereof disclosed herein, being spatially separated or in both of these components or in the form of a separate component thus resulting in the kit-of-parts comprising three components.

Such at least one further fungicide, bactericide or insecticide which may be comprised in the composition of the invention or the kit-of-parts may be any compatible insecticide, bactericide and/or fungicide used in a target plant. For sequential application with at least one insecticide, bactericide and/or fungicide, compatibility with the fungicidally and/or bactericidally active bacterium is of less importance.

Moreover, the kit of parts according to the present invention can additionally comprise at least one auxiliary selected from the group consisting of extenders, solvents, spontaneity promoters, carriers, emulsifiers, dispersants, frost protectants, thickeners and adjuvants as mentioned below. This at least one auxiliary can be present in the component of the kit of parts comprising the particular biological control agent or in the component comprising the at least one fatty acid or derivative thereof disclosed herein, being spatially separated or in both of these components or in the form of a separate component thus resulting in the kit-of-parts comprising three components.

The following examples illustrate the invention in a non-limiting fashion.

Example 1: Production of Fatty Acid Derivative

A salt derivative of fatty acids can be prepared by the following method. This fatty acid salt derivative is referred to as ABP-510 herein. ABP-510 is obtained by mixing in a reactor a selection of fatty acids (C14-C18) derived from olive oil following oil hydrolysis whereby the glycerine is separated from the fatty acids and the fatty acids are subjected to fractional distillation in order to achieve the required specification. The fatty acids are made to react in a temperature controlled blending vessel with such quantity of potassium hydroxide and water for the production of the liquid fatty acid salt until solubilization of the components occurs and a liquid is produced that will readily form a true solution when diluted in water at the recommended rates of application for use in the field.

Example 2: Test of a *B. subtilis* Strain and Fatty Acids Against Scab

For this example, the Product FLIPPER® (AlphaBioControl) was used. To test efficacy of *B. subtilis* strain QST713 and/or a product comprising fatty acids in comparison to chemical fungicides, a field trial was set up in three replicates with 5 apple trees per plot as per the scheme according to table 1. On Mar. 30, 2018 the first spray was carried out in the presence of a natural infestation of *Venturia inaequalis* ascospores (scab). The applications were carried out with an interval of 5-6 days until the second week of June.

TABLE 1

[1]Merpan: 80% captan, [2]Delan: 70% dithianon, [3]Serenade: *Bacillus subtilis*, strain QST 713 (1.0 × 10$^9$ CFU/g), [4]Flipper: 479.8 g/l Carboxylic Acid Potassium Salt

| Treatment Number | Treatment |
|---|---|
| 1. | UTC |
| 2. | 1.8 kg/ha Merpan[1] in alternation with 0.425 kg/ha Delan DF[2] |
| 3. | 5.0 l/ha. Serenade[3] |
| 4. | 5.0 l/ha Serenade + 2.5 l/ha Flipper[4] |
| 5. | 5.0 l/ha. Serenade + 5 l/ha Flipper |
| 6. | 5 l/ha. Flipper |

TABLE 2

Number of infested leaved per 80 leaves per plot

| Treatment | Replicate | Infested leaves per 80 leaves per plot Nov. 6, 2018 | May 7, 2018 |
|---|---|---|---|
| 1 | A | 23 | 31 |
|  | B | 17 | 24 |
|  | C | 19 | 37 |
| SUM |  | 59 | 92 |
| 2 | A | 8 | 12 |
|  | B | 2 | 3 |
|  | C | 12 | 10 |
| SUM |  | 22 | 25 |
| 3 | A | 5 | 19 |
|  | B | 9 | 21 |
|  | C | 20 | 25 |
| SUM |  | 34 | 65 |
| 4 | A | 8 | 11 |
|  | B | 5 | 18 |
|  | C | 11 | 18 |
| SUM |  | 24 | 47 |
| 5 | A | 4 | 20 |
|  | B | 6 | 14 |
|  | C | 8 | 5 |
| SUM |  | 18 | 39 |
| 6 | A | 8 | 9 |
|  | B | 12 | 22 |
|  | C | 11 | 19 |
| SUM |  | 31 | 50 |

Evaluation:

80 leaves per plot were evaluated at two dates for infestation with scab.

Results are depicted in table 2 and the resulting efficacy in table 3.

TABLE 3

Summary percentage efficacy control of Scab.

| Treatment Number | Treatment | % efficacy Nov. 6, 2018 | May 7, 2018 |
|---|---|---|---|
| 1. | UTC | 0% | 0% |
| 2. | 1.8 kg/ha Merpan in alternation with 0.425 kg/ha Delan DF | 63% | 73% |
| 3. | 5.0 l/ha. Serenade | 42% | 29% |
| 4. | 5.0 l/ha Serenade + 2.5 l/ha Flipper | 59% | 49% |
| 5. | 5.0 l/ha. Serenade + 5 l/ha Flipper | 69% | 58% |
| 6. | 5 l/ha. Flipper | 47% | 46% |

Example 3: Synergistic Action

A synergistic effect of fungicides is always present when the fungicidal activity of the active compound combinations exceeds the total of the activities of the active compounds when applied individually. The expected activity for a given combination of two active compounds can be calculated as follows (according to Colby's formula) (cf. Colby, S. R., "Calculating Synergistic and Antagonistic Responses of Herbicide Combinations", Weeds 1967, 15, 20-22):

If
X is the efficacy when active compound A is applied at an application rate of m ppm (or g/ha),
Y is the efficacy when active compound B is applied at an application rate of n ppm (or g/ha),
E is the efficacy when the active compounds A and B are applied at application rates of m and n ppm (or g/ha), respectively, and
then $$E = X + Y - \frac{X \cdot Y}{100}$$

The degree of efficacy expressed in % is denoted. 0% means an efficacy which corresponds to that of the control while an efficacy of 100% means that no disease is observed.

If the actual fungicidal activity exceeds the calculated value, then the activity of the combination is superadditive, i.e. a synergistic effect exists. In this case, the efficacy which was actually observed must be greater than the value for the expected efficacy (E) calculated from the abovementioned formula.

A further way of demonstrating a synergistic effect is the method of Tammes (cf. "Isoboles, a graphic representation of synergism in pesticides" in Neth. J. Plant Path., 1964, 70, 73-80).

The invention is illustrated by the following examples. However the invention is not limited to the examples.

Example 4: Synergistic Action of a *B. subtilis* Strain and Fatty Acids; Late Blight Test on Tomato Serenade ASO commercial product (1×10$^9$ CFU/ml), FLIPPER commercial product (491.8 g/l potassium salt of fatty acids), or combinations thereof were diluted with deionized water to the desired concentration.

To test for preventive activity, young plants were sprayed with the preparation of products at the stated rates of application. After the spray coating had dried on, the plants are inoculated with an aqueous spore suspension of *Phytophthora infestans*. The plants were then placed in an incubation cabinet at approximately 20° C. and a relative atmospheric humidity of 100%.

TABLE 4

Late blight test (tomato)/preventive

| Active compounds | Application rate of product in % volume. | Efficacy in % | |
|---|---|---|---|
| | | found* | calc.** |
| Serenade ASO (QST713) | 0.5 | 6 | |
| FLiPPER | 0.5 | 24 | |
| Serenade + FLiPPER 1:1 | 0.5 + 0.5 | 42 | 29 |

*found = activity found
**calc. = activity calculated using Colby's formula

The test was evaluated 5 days after inoculation. 0% means an efficacy which corresponds to that of the untreated control, while an efficacy of 100% means that no disease is observed.

Table 4 below clearly shows that the observed activity of the active compound combination according to the invention is greater than the calculated activity, i.e. a synergistic effect is present.

Example 5: Synergistic Action of a *B. subtilis* Strain and Fatty Acids; Gray Mold Test on Pepper Serenade ASO commercial product, FLIPPER commercial product, or combinations thereof were diluted with deionized water to the desired concentration.

To test for preventive activity, young plants were sprayed with the preparations of products at the stated rates of application. After the spray coating had dried on, the plants were inoculated with a spore suspension of *Botrytis cinerea*. The plants were then placed in an incubation cabinet at approximately 20° C. and a relative atmospheric humidity of 100%.

The test was evaluated 3 days after the inoculation. 0% means an efficacy which corresponds to that of the untreated control, while an efficacy of 100% means that no disease is observed.

TABLE 5

Gray mold test (pepper)/preventive

| Active compounds | Application rate of product in % volume. | Efficacy in % | |
|---|---|---|---|
| | | found* | calc.** |
| Serenade ASO (QST713) | 2 | 45 | |
| | 1 | 37 | |
| FLiPPER | 2 | 56 | |
| | 1 | 14 | |
| Serenade + FLiPPER 1:1 | 2 + 2 | 82 | 76 |
| | 1 + 1 | 62 | 46 |

*found = activity found
**calc. = activity calculated using Colby's formula

Table 5 clearly shows that the observed activity of the active compound combination according to the invention is greater than the calculated activity, i.e. a synergistic effect is present.

Example 6: Synergistic Action of a *B. subtilis* Strain and Fatty Acids; Wheat Leaf Rust Test on Wheat Serenade ASO commercial product, FLIPPER commercial product, or combinations thereof were diluted with deionized water to the desired concentration.

To test for preventive activity, young plants were sprayed with the preparation of products at the stated rates of application. After the spray coating had dried on, the plants were inoculated with an aqueous spore suspension of *Puccinia tritici*. The plants were then placed in an incubation cabinet at approximately 20° C. and a relative atmospheric humidity of 100%.

The test was evaluated 10 days after the inoculation. 0% means an efficacy which corresponds to that of the untreated control, while an efficacy of 100% means that no disease is observed.

Table 6 below clearly shows that the observed activity of the active compound combination according to the invention is greater than the calculated activity, i.e. a synergistic effect is present.

TABLE 6

Wheat leaf rust test (wheat)/preventive

| Active compounds | Application rate of product in % volume. | Efficacy in % | |
|---|---|---|---|
| | | found* | calc.** |
| Serenade ASO (QST713) | 1 | 63 | |
| | 0.5 | 38 | |
| | 0.25 | 25 | |
| FLiPPER | 1 | 71 | |
| | 0.5 | 25 | |
| | 0.25 | 0 | |
| Serenade + FLiPPER 1:1 | 1 + 1 | 100 | 89 |
| | 0.5 + 0.5 | 95 | 54 |
| | 0.25 + 0.25 | 79 | 25 |

*found = activity found
**calc. = activity calculated using Colby's formula

Example 7: Synergistic Action of a *Paenibacillus* Spp. Strain and Fatty Acids; Cucurbit Powdery Mildew on Cucumbers

*Paenibacillus* spp. strain NRRL B-67615 in a suspension concentrate (SC) formulation ($4 \times 10^6$ CFU/ml), FLIPPER commercial product, or combinations thereof were diluted with deionized water to the desired concentration.

The application rate of *Paenibacillus* spp. refers to the amount of *Paenibacillus* spp. strain NRRL B-67615 formulated as a suspension concentrate.

To test for curative activity, young plants were inoculated with an aqueous spore suspension of *Podosphaera xanthii* in a greenhouse and 3 days later, the plants were sprayed with the preparation of test samples at the stated rate of application. After the spray coating had dried on, the plants were returned to the greenhouse.

The test was evaluated 4 days after the treatments were applied. 0% means an efficacy which corresponds to that of the untreated control, while an efficacy of 100% means that no disease is observed.

Table 7 below clearly shows that the observed activity of the active compound combination according to the invention is greater than the calculated activity, i.e. a synergistic effect is present.

TABLE 7

| Cucurbit powdery mildew test (cucumber)/curative | | | |
|---|---|---|---|
| | Application rate of material | Efficacy in % | |
| Active compounds | in % volume | found* | calc.** |
| *Paenibacillus* spp. NRRL B-67615 | 0.5 | 0 | |
| FLiPPER | 2 | 53 | |
| *Paenibacillus* spp. NRRL B-67615 + FLiPPER | 0.5 + 2 | 68 | 53 |

*found = activity found
**calc. = activity calculated using Colby's formula

Example 8: Synergistic Action of a *Paenibacillus* Spp. Strain and Fatty Acids; Wheat Leaf Rust on Wheat

*Paenibacillus* spp. strain NRRL B-67615 in a suspension concentrate (SC) formulation, FLIPPER commercial product, or combinations thereof were diluted with deionized water to the desired concentration.

The application rate of *Paenibacillus* SC refers to the amount of *Paenibacillus* strain NRRL B-67615 formulated as a suspension concentrate.

To test for preventive activity, young plants were sprayed with the preparation of products at the stated rates of application. After the spray coating had dried on, the plants were inoculated with an aqueous spore suspension of *Puccinia tritici*. The plants were then placed in an incubation cabinet at approximately 20° C. and a relative atmospheric humidity of 100%.

The test was evaluated 10 days after the inoculation. 0% means an efficacy which corresponds to that of the untreated control, while an efficacy of 100% means that no disease is observed.

Table 8 below clearly shows that the observed activity of the active compound combination according to the invention is greater than the calculated activity. i.e. a synergistic effect is present.

TABLE 8

| Wheat leaf rust test (wheat)/preventive | | | |
|---|---|---|---|
| | Application rate of material | Efficacy in % | |
| Active compounds | in % volume | found* | calc.** |
| *Paenibacillus* spp. NRRL B-67615 | 0.5 | 0 | |
| FLiPPER | 2 | 38 | |
| *Paenibacillus* NRRL B-67615 + FLiPPER | 0.5 + 2 | 58 | 38 |

*found = activity found
**calc. = activity calculated using Colby's formula

The invention claimed is:

1. A composition comprising:

(a) At least one biological control agent which is a fungicidally active bacterium and/or a fungicidally active metabolite produced by the respective bacterium, wherein said at least one biological control agent is a strain of a *Paenibacillus* sp., wherein the at least one biological control agent is present in in an amount of about 1% to about 80% (w/w); and (b) one or more fatty acids or derivatives thereof selected from unsaturated and saturated $C_{12-24}$ fatty acids, salts thereof, esters thereof or mixtures of any of the foregoing, wherein the one or more fatty acids or derivatives thereof is present in an amount of about 0.1% to about 10% (w/w), wherein the composition is a synergistic composition.

2. The composition according to claim 1, wherein said at least one or more biological control agents is a *Paenibacillus* sp. strain having Accession No. NRRL B-50972 or Accession No. NRRL B-67129 and/or a mutant of these strains having all the identifying characteristics of the respective strain, and/or a metabolite produced by the respective strain that exhibits activity against phytopathogens.

3. The composition according to claim 2, wherein said one or more biological control agents is the *Paenibacillus* sp. strain having Accession No. NRRL B-50972.

4. The composition according to claim 1, wherein said one or more fatty acids or derivatives thereof are selected from unsaturated and saturated $C_{14-20}$ fatty acids, salts thereof, esters thereof or mixtures of any of the foregoing.

5. The composition according to claim 1, wherein the one or more fatty acids or derivatives thereof comprises two or more fatty acids selected from C16:0 fatty acids, C16:1 fatty acids, C18:0 fatty acid, C18:1 fatty acids, C18:2 fatty acids, and C18:3 fatty acids, or salts thereof.

6. The composition according to claim 1, wherein the one or more fatty acids or derivatives thereof comprises oleic acid or a salt thereof.

7. The composition according to claim 1, wherein the one or more fatty acids or derivatives thereof comprises one or more metal salts of fatty acids, which one or more metal salts of fatty acids are obtainable by a process comprising (a) Providing a vegetable oil;

(b) Hydrolyzing triglycerides in the vegetable oil;

(c) Extracting fatty acids from the hydrolyzed vegetable oil; and (d) Forming the metal salts of the extracted fatty acids.

8. The composition according to claim 1, wherein the one or more fatty acid derivatives are alkali metal salts of fatty acids.

9. The composition according to claim 1, wherein said one or more fatty acid derivatives are salts of lithium, sodium, potassium, magnesium, calcium, aluminum, copper, iron, zinc, or a mixture thereof.

10. The composition according to claim 1, wherein component b) is one or more fatty acid.

11. The composition according to claim 1 additionally comprising at least one auxiliary selected from the group consisting of extenders, solvents, spontaneity promoters, carriers, emulsifiers, dispersants, frost protectants, thickeners and adjuvants.

12. The composition of claim 7, wherein the vegetable oil is olive oil.

13. The composition of claim 8, wherein the alkali metal salts of fatty acids are potassium salts of fatty acids.

* * * * *